(12) United States Patent
Hirezaki et al.

(10) Patent No.: US 8,706,961 B2
(45) Date of Patent: Apr. 22, 2014

(54) STORAGE APPARATUS AND DATA MANAGEMENT METHOD

(75) Inventors: Katsumi Hirezaki, Odawara (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 13/320,443

(22) PCT Filed: Oct. 31, 2011

(86) PCT No.: PCT/JP2011/006094
§ 371 (c)(1),
(2), (4) Date: Nov. 14, 2011

(87) PCT Pub. No.: WO2013/065081
PCT Pub. Date: May 10, 2013

(65) Prior Publication Data
US 2013/0111171 A1 May 2, 2013

(51) Int. Cl.
*G06F 12/00* (2006.01)
(52) U.S. Cl.
USPC .............. 711/117; 711/E12.069; 711/162; 711/114
(58) Field of Classification Search
USPC ....................................................... 711/117
See application file for complete search history.

(56) References Cited

U.S. PATENT DOCUMENTS

| 2007/0055715 | A1 | 3/2007 | Achiwa |
| 2009/0157756 | A1 | 6/2009 | Sanvido |
| 2011/0035409 | A1 | 2/2011 | Shimada et al. |
| 2011/0231631 | A1 | 9/2011 | Matsuzawa et al. |

FOREIGN PATENT DOCUMENTS

| JP | 2007-072813 | 3/2007 |
| JP | 2011-034525 | 2/2011 |

OTHER PUBLICATIONS

Harker, John, et al.; "Dynamic Storage Tiering: the Integration of Block, File and Content"; Sep. 2010; pp. 1-16; Hitachi Data Systems Corporation.
PCT International Search Report and Written Opinion on application PCT/JP2011/006094 mailed May 4, 2012; 14 pages.

*Primary Examiner* — Reginald Bragdon
*Assistant Examiner* — Hamdy S Ahmed
(74) *Attorney, Agent, or Firm* — Foley & Lardner LLP

(57) ABSTRACT

Data is managed efficiently by switching between block level hierarchical control and file level hierarchical control according to file characteristics. A storage apparatus which is connected via a network to a host computer which requests data writing comprises storage media of a plurality of types of varying performance, a volume management unit which manages storage areas provided by the storage media of the plurality of types as different storage tiers and manages storage tiers of the same type or different types as a pool and provides predetermined areas of the pool to the host computer as volumes, and a file management unit which constructs file systems, for managing data in file units configured from a plurality of blocks, in the volumes, and receives file unit data write requests from the host computer.

11 Claims, 72 Drawing Sheets

FIG.4
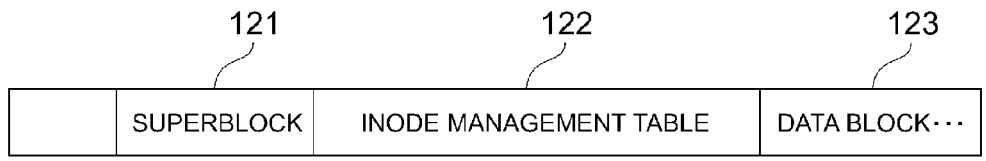
FIG.5
FIG.6
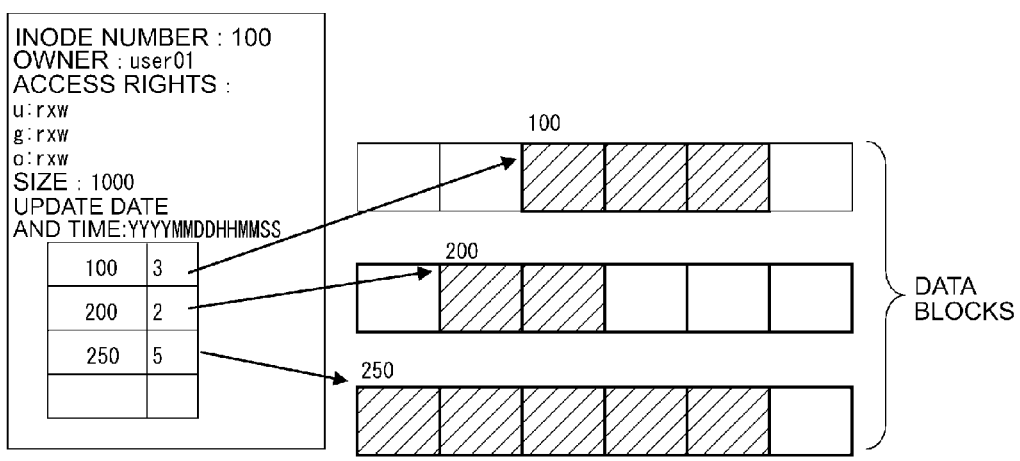

FIG.9

| PAGE NUMBER | LDEV NUMBER | REAL ADDRESS | ASSIGNMENT STATE |
|---|---|---|---|
| 1 | 1 | 100000 | 1 (ASSIGNED) |
| 2 | 1 | 100100 | 0 (UNASSIGNED) |
| 3 | 2 | 200000 | 1 |
| 4 | 3 | 300000 | 1 |
| 5 | 1 | 100200 | 0 |
| 6 | 1 | 100300 | 0 |

| VIRTUAL LU ADDRESS | PAGE NUMBER | Offset |
|---|---|---|
| 0 | 1 | 0 |
| 100 | 2 | 0 |
| 200 | - | 100 |
| : | : | : |

| REAL ADDRESS | HDD NUMBER | PHYSICAL ADDRESS |
|---|---|---|
| 100 | 1 | 100000 |
| 200 | 2 | 100100 |
| 300 | 3 | 200000 |
| 400 | 4 | 300000 |
| 500 | 1 | 100100 |
| 600 | 2 | 100200 |
| 700 | 3 | 200100 |
| 800 | 4 | 300100 |
| : | : | : |

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTINATION TIER NUMBER | MIGRATION-DESTINATION INODE NUMBER | DATA BLOCK ADDRESS 1 | DATA BLOCK ADDRESS 2 | ... |
|---|---|---|---|---|---|---|---|---|---|---|
| 1221 | 1222 | 1223 | 1224 | 1225 | 1226 | 1227 | 1228 | 1229 | 1229 | |

(TIER 2 TO 4 INODE MANAGEMENT TABLE)

| INODE NUMBER | OWNER | ACCESS RIGHTS | SIZE | FINAL ACCESS DATE AND TIME | DATA BLOCK ADDRESS 1 | DATA BLOCK ADDRESS 2 | ... |
|---|---|---|---|---|---|---|---|
| 1221 | 1222 | 1223 | 1224 | 1225 | 1229 | 1229 | |

(TIER 1: PAGE MANAGEMENT TABLE)

270

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 0(UNASSIGNED) TO 1(ASSIGNED) | SSD | |
| 2 | 1 | 100100 | 0(UNASSIGNED) TO 1(ASSIGNED) | SSD | |
| 3 | 2 | 200000 | 1 | SAS | |
| 4 | 2 | 200100 | 0(UNASSIGNED) | SAS | |
| 5 | 3 | 300000 | 1 | SATA | |
| 6 | 3 | 300100 | 0(UNASSIGNED) | SATA | |

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTINATION TIER NUMBER | MIGRATION-DESTINATION INODE NUMBER | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|---|---|---|
| | | | | | - | - | - | 0 | 200 | |
| 1221 | 1222 | 1223 | 1224 | 1225 | 1226 | 1227 | 1228 | 1229 | 1229 | |

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTINATION TIER NUMBER | MIGRATION-DESTINATION INODE NUMBER | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|---|---|---|
| 2 | | | | | 1 | 3 | 3010 | - | - | |
| 1221 | 1222 | 1223 | 1224 | 1225 | 1226 | 1227 | 1228 | 1229 | 1229 | |

(FILE MANAGEMENT TABLE)

| FILE NUMBER | FILE NAME | CURRENT TIER | I-NODE | ACCESS COUNT | TIERING-ENABLED RANGE |
|---|---|---|---|---|---|
| 1 | A.txt | Tier1 | 1 | 12 | (Tier1,2,3,4) |
| 2 | B.doc | Tier3 | 2 | 10→11 | (Tier1,2,3,4) |
| 3 | C.xls | Tier4 | 3 | 10 | (Tier1,2,3,4) |
| 4 | D.txt | Tier3 | 4 | 1 | (Tier3,4) |
| 5 | E.doc | Tier4 | 5 | 8 | (Tier4) |
| 6 | F.db | Tier1 | 6 | 10 | (Tier1) |
| 7 | G.pdf | Tier1 | 7 | 1 | (Tier2,3,4) |

(TIER 3: INODE MANAGEMENT TABLE)

| INODE NUMBER | OWNER | ACCESS RIGHTS | SIZE | FINAL ACCESS DATE AND TIME | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|
| 3010 | | | | | | | |
| 1221 | 1222 | 1223 | 1224 | 1225 | 1229 | 1229 | |

(TIER 3: VIRTUAL LU CONFIGURATION TABLE)

| VIRTUAL LU ADDRESS | PAGE NUMBER | Offset |
|---|---|---|
| 3000 | 1 | 0 |
| 3050 | 1 | 50 |
| 3100 | 2 | 0 |
| ⋮ | ⋮ | ⋮ |

(TIER 3: PAGE MANAGEMENT TABLE)

| PAGE NUMBER | LDEV NUMBER | REAL ADDRESS | ASSIGNMENT STATE |
|---|---|---|---|
| 1 | 3 | 300000 | 1 (ASSIGNED) |
| 2 | 3 | 300100 | 1 |
| 3 | 3 | 300200 | 1 |
| 4 | 3 | ... | 0 (UNASSIGNED) |
| 5 | 3 | ... | 1 |
| 6 | 3 | ... | 0 |

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTINATION TIER NUMBER | MIGRATION-DESTINATION INODE NUMBER | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|---|---|---|
| 3 | | | | | - | - | - | 0 | 200 | |
| 1221 | 1222 | 1223 | 1224 | 1225 | 1226 | 1227 | 1228 | 1229 | 1229 | |

122A (TIER 1: VIRTUAL LU CONFIGURATION TABLE)

FIG.28

(TIER 1: PAGE MANAGEMENT TABLE)

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 1 (ASSIGNED) | SSD | |
| 2 | 1 | 100100 | 1 (ASSIGNED) | SSD | 1→2 |
| 3 | 2 | 200000 | 1 | SAS | |
| 4 | 2 | 200100 | 0 (UNASSIGNED) | SAS | |
| 5 | 3 | 300000 | 1 | SATA | |
| 6 | 3 | 300100 | 0 (UNASSIGNED) | SATA | |

FIG.30

(TIER 1: PAGE MANAGEMENT TABLE)                                    270

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 1 (ASSIGNED) | SSD | 5 |
| 2 | 1 | 100100 | 0 (UNASSIGNED) | SSD | – |
| 3 | 2 | 200000 | 1 | SAS | 1 |
| 4 | 2 | 200100 | 0 (UNASSIGNED) | SAS | – |
| 5 | 3 | 300000 | 1 | SATA | 6 |
| 6 | 3 | 300100 | 0 (UNASSIGNED) | SATA | – |

(TIER 1: VIRTUAL LU CONFIGURATION TABLE)

| VIRTUAL LU ADDRESS | PAGE NUMBER | Offset |
|---|---|---|
| 0 | 1 | 0 |
| 50 | 1 | 50 |
| 100 | 2 | 0 |
| 150 | 2 | 50 |
| 200 | 3 | 0 |
| 250 | 3 | 50 |
| 300 | 4 | 0 |
| 350 | 4 | 50 |

2711　　2712　　2713　　271

(PAGE MIGRATION MANAGEMENT TABLE)

FIG.34

(TIER 1: PAGE MANAGEMENT TABLE)    270

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 1 (ASSIGNED) | SSD | 5 |
| 2 | 1 | 100100 | 0 (UNASSIGNED) | SSD | - |
| 3 | 2 | 200000 | 1 | SAS | 1 |
| 4 | 2 | 200100 | 0(UNASSIGNED)→1(ASSIGNED) | SAS | - |
| 5 | 3 | 300000 | 1 | SATA | 6 |
| 6 | 3 | 300100 | 0 (UNASSIGNED) | SATA | - |

(TIER 1: VIRTUAL LU CONFIGURATION TABLE)

| VIRTUAL LU ADDRESS | PAGE NUMBER | Offset |
|---|---|---|
| 0 | 1→4 | 0 |
| 50 | 1→4 | 50 |
| 100 | 3 | 0 |
| 150 | 3 | 50 |
| 200 | 5 | 0 |
| 250 | 5 | 50 |
| 300 | 7 | 0 |
| 350 | 7 | 50 |

(TIER 1: PAGE MANAGEMENT TABLE)   270

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 1(ASSIGNED)→0(UNASSIGNED) | SSD | 5→0 |
| 2 | 1 | 100100 | 0 (UNASSIGNED) | SSD | – |
| 3 | 2 | 200000 | 1 | SAS | 1 |
| 4 | 2 | 200100 | 0(UNASSIGNED)→1(ASSIGNED) | SAS | – |
| 5 | 3 | 300000 | 1 | SATA | 6 |
| 6 | 3 | 300100 | 0 (UNASSIGNED) | SATA | – |

(FILE MANAGEMENT TABLE)

| FILE NUMBER | FILE NAME | CURRENT TIER | I-NODE | ACCESS COUNT | TIERING-ENABLED RANGE |
|---|---|---|---|---|---|
| 1 | A.txt | Tier2 | 1 | 12 | (Tier1,2,3,4) |
| 2 | B.doc | Tier3 | 2 | 1 | (Tier1,2,3,4) |
| 3 | C.xls | Tier4 | 3 | 10 | (Tier1,2,3,4) |
| 4 | D.txt | Tier3 | 4 | 1 | (Tier3,4) |
| 5 | E.doc | Tier4 | 5 | 8 | (Tier4) |
| 6 | F.db | Tier1 | 6 | 10 | (Tier1) |

(FILE MIGRATION MANAGEMENT TABLE)

| FILE NUMBER | CURRENT TIER | MIGRATION DESTINATION TIER |
|---|---|---|
| 1 | Tier2 | Tier3 |
| 2 | Tier3 | Tier4 |
| 3 | Tier4 | Tier3 |

(TIER 3: PAGE MANAGEMENT TABLE)

270

| PAGE NUMBER | LDEV NUMBER | REAL ADDRESS | ASSIGNMENT STATE |
|---|---|---|---|
| 21 | 21 | 220100 | 1 (ASSIGNED) |
| 22 | 21 | 220200 | 0 (UNASSIGNED) |
| 23 | 22 | 220300 | 1 |
| 24 | 22 | 220400 | 0(UNASSIGNED)→1(ASSIGNED) |
| 25 | 23 | 220500 | 1 |
| 26 | 23 | 220600 | 0(UNASSIGNED)→1(ASSIGNED) |

2701  2702  2703  2704

(TIER 3: VIRTUAL LU CONFIGURATION TABLE)

FIG.44

(TIER 2: PAGE MANAGEMENT TABLE)

270

| PAGE NUMBER | LDEV NUMBER | REAL ADDRESS | ASSIGNMENT STATE |
|---|---|---|---|
| 11 | 11 | 110100 | 1 (ASSIGNED) |
| 12 | 11 | 110200 | 0 (UNASSIGNED) |
| 13 | 12 | 110300 | 1 |
| 14 | 12 | 110400 | 1(ASSIGNED)→0(UNASSIGNED) |
| 15 | 13 | 110500 | 1 |
| 16 | 13 | 110600 | 1(ASSIGNED)→0(UNASSIGNED) |

(TIER 2: VIRTUAL LU CONFIGURATION TABLE)

| VIRTUAL LU ADDRESS | PAGE NUMBER | Offset |
|---|---|---|
| ... | .. | |
| 1050 | 13 | 0 |
| 1100 | 13 | 50 |
| 1150 | — | 0 |
| 1200 | 14 | 50 |
| 1250 | 15 | 0 |
| 1300 | 15 | 50 |
| 1350 | — | 0 |
| 1400 | 16 | 50 |
| 2711 | 2712 | 2713 |

(TIER 2: I-NODE MANAGEMENT TABLE)

| INODE NUMBER | OWNER | ACCESS RIGHTS | SIZE | FINAL ACCESS DATE AND TIME | DATA BLOCK ADDRESS1 | DATA BLOCK ADDRESS2 | ... |
|---|---|---|---|---|---|---|---|
| 21 | | | | | | | |
| 23 | | | | | | | |
| 25 | | | | | 1150 | 1350 | |

1221  1222  1223  1224  1225  1229  1229

← OPEN INODE

← OPEN VIRTUAL LU ADDRESS

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTINATION TIER NUMBER | MIGRATION-DESTINATION INODE NUMBER | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|---|---|---|
| | | | | | 1 | 2 → 3 | 25 → 36 | 1150 → 2150 | 1350 → 2350 | |
| 1221 | 1222 | 1223 | 1224 | 1225 | 1226 | 1227 | 1228 | 1229 | 1229 | |

(FILE BLOCK CONFIGURATION LIST)

| | | | |
|---|---|---|---|
| TIME: t2 | | | |
| TIME: t1 | | | |
| TIME: t0 | | | |
| FILE PATH NAME | SSD | SAS | SATA |
| /home/share/a.txt | 0% | 100% | 0% |
| /homeshare/b.txt | 0% | 0% | 100% |
| ... | ... | ... | ... |
| /home/share/x.txt | 5% | 0% | 95% |
| ... | ... | ... | ... |

(FILE MANAGEMENT TABLE)

| FILE NUMBER | FILE NAME | CURRENT TIER | I-NODE | ACCESS COUNT | TIERING-ENABLED RANGE |
|---|---|---|---|---|---|
| 1 | A.txt | Tier1 | 1 | 12 | (Tier1,2,3,4) |
| 2 | B.doc | Tier3 | 2 | 1 | (Tier1,2,3,4) |
| 3 | C.xls | Tier4 | 3 | 10 | (Tier1,2,3,4) |
| 4 | D.txt | Tier3 | 4 | 1 | (Tier3,4) |
| 5 | E.doc | Tier4 | 5 | 8 | (Tier4) |
| 6 | F.db | Tier1 | 6 | 10 | (Tier1) |
| 7 | G.pdf | Tier1 | 7 | 1 | (Tier2,3,4) |

(FILE MIGRATION MANAGEMENT TABLE) 143

| FILE NUMBER | CURRENT TIER | MIGRATION DESTINATION TIER | |
|---|---|---|---|
| 1 | Tier1 | Tier3 | BIASED TOWARD TIER 3(SAS) AND TIER-ENABLED RANGE (TIER S 1, 2, 3, 4)<br><br>→CHANGE TO FILE LEVEL TIERING AND DATA MIGRATION TO TIER 3 |
| 7 | Tier1 | Tier4 | LARGE AMOUNT OF DATA IN TIER 4 (SATA) AND TIER-ENABLED RANGE (TIER S 2, 3, 4)<br><br>→CHANGE TO FILE LEVEL TIERING AND DATA MIGRATION TO TIER 4 |
| 1431 | 1432 | 1433 | 1434 |

FIG.53

(TIER 3: PAGE MANAGEMENT TABLE)

270

| PAGE NUMBER | LDEV NUMBER | REAL ADDRESS | ASSIGNMENT STATE |
|---|---|---|---|
| 21 | 21 | 220100 | 1 (ASSIGNED) |
| 22 | 21 | 220200 | 0 (UNASSIGNED) |
| 23 | 22 | 220300 | 1 |
| 24 | 22 | 220400 | 0(UNASSIGNED)→1(ASSIGNED) |
| 25 | 23 | 220500 | 1 |
| 26 | 23 | 220600 | 0(UNASSIGNED)→1(ASSIGNED) |

(TIER 3: VIRTUAL LU CONFIGURATION TABLE)

| VIRTUAL LU ADDRESS | PAGE NUMBER | Offset |
|---|---|---|
| ... | .. | |
| 2050 | 23 | 0 |
| 2100 | 23 | 50 |
| 2150 | 24 | 0 |
| 2200 | 24 | 50 |
| 2250 | 25 | 0 |
| 2300 | 25 | 50 |
| 2350 | 26 | 0 |
| 2400 | 26 | 50 |

(TIER 3: INODE MANAGEMENT TABLE OF FILE SYSTEM)

| INODE NUMBER | OWNER | ACCESS RIGHTS | SIZE | FINAL ACCESS DATE AND TIME | DATA BLOCK ADDRESS1 | DATA BLOCK ADDRESS2 | ... |
|---|---|---|---|---|---|---|---|
| 32 | | | | | | | |
| 34 | | | | | | | |
| 36 | | | | | 2150 | 2350 | ← SECURE I-NODE |

1221　1222　1223　1224　1225　1229　1229

1229 ← VIRTUAL LU ADDRESS CONFIGURATION

(TIER 1: PAGE MANAGEMENT TABLE)

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 1(ASSIGNED)→0(UNASSIGNED) | SSD | 5 |
| 2 | 1 | 100100 | 0 (UNASSIGNED) | SSD | – |
| 3 | 2 | 200000 | 1 | SAS | 1 |
| 4 | 2 | 200100 | 0 (UNASSIGNED) | SAS | – |
| 5 | 3 | 300000 | 1 | SATA | 6 |
| 6 | 3 | 300100 | 0 (UNASSIGNED) | SATA | – |

(TIER 1: VIRTUAL LU CONFIGURATION TABLE)

| VIRTUAL LU ADDRESS | PAGE NUMBER | Offset |
|---|---|---|
| 0 | — | 0 |
| 50 | — | 50 |
| 100 | 3 | 0 |
| 150 | 3 | 50 |
| 200 | 5 | 0 |
| 250 | 5 | 50 |
| 300 | 7 | 0 |
| 350 | 7 | 50 |

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTINATION TIER NUMBER | MIGRATION-DESTINATION INODE NUMBER | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|---|---|---|
| | | | | | 0 → 1 | — → 2 | — → 36 | 0 → 2150 | 50 → 2350 | |
| 1221 | 1222 | 1223 | 1224 | 1225 | 1226 | 1227 | 1228 | 1229 | 1229 | |

(FILE MANAGEMENT TABLE)

| FILE NUMBER | FILE NAME | CURRENT TIER | I-NODE | ACCESS COUNT | TIERING-ENABLED RANGE |
|---|---|---|---|---|---|
| 1 | A.txt | Tier1 | 1 | 12 | (Tier1,2,3,4) |
| 2 | B.doc | Tier3 | 2 | 1 | (Tier1,2,3,4) |
| 3 | C.xls | Tier4 | 3 | 10 | (Tier1,2,3,4) |
| 4 | D.txt | Tier3 | 4 | 1 | (Tier3,4) |
| 5 | E.doc | Tier4 | 5 | 8 | (Tier4) |
| 6 | F.db | Tier1 | 6 | 10 | (Tier1) |
| 7 | G.pdf | Tier1 | 7 | 1 | (Tier2,3,4) |
| 8 | x.txt | Tier2 | 8 | 100 | (Tier1,2,3,4) |

(FILE MIGRATION MANAGEMENT TABLE)                                    143

| FILE NUMBER | CURRENT TIER | MIGRATION DESTINATION TIER | |
|---|---|---|---|
| 8 | Tier2 | Tier1 | FILE MIGRATION IS FREQUENT AND TIER-ENABLED RANGE (TIERS 1, 2, 3, 4) →CHANGE TO BLOCK LEVEL TIERING |
| 1431 | 1432 | 1433 | 1434 |

FIG.63

(TIER 1: PAGE MANAGEMENT TABLE)

| PAGE NUMBER | LDEV NUMBER | REAL ADDRESS | ASSIGNMENT STATE | MEDIA TYPE | ACCESS COUNT |
|---|---|---|---|---|---|
| 1 | 1 | 100000 | 0(UNASSIGNED)→1(ASSIGNED) | SSD | — |
| 2 | 1 | 100100 | 0 (UNASSIGNED) | SSD | — |
| 3 | 2 | 200000 | 1 | SAS | 1 |
| 4 | 2 | 200100 | 0 (UNASSIGNED) | SAS | — |
| 5 | 3 | 300000 | 1 | SATA | 6 |
| 6 | 3 | 300100 | 0 (UNASSIGNED) | SATA | — |

(TIER 1 INODE MANAGEMENT TABLE)

| INODE NUMBER | OWNER | ACCESS RIGHTS | SIZE | FINAL ACCESS DATE AND TIME | STUBBING FLAG | MIGRATION-DESTI-NATION TIER NUMBER | MIGRATION-DESTI-NATION INODE NUMBER | DATA BLOCK ADDRESS 1 (VIRTUAL LU ADDRESS) | DATA BLOCK ADDRESS 2 (VIRTUAL LU ADDRESS) | ... |
|---|---|---|---|---|---|---|---|---|---|---|
| 33 | | | | | | | | | | |
| 34 | | | | | | | | | | |
| 35 | | | | | 1 → 0 | 2 → — | 6 → — | 1150 → 0 | 1350 → 50 | |
| 1221 | 1222 | 1223 | 1224 | 1225 | 1226 | 1227 | 1228 | 1229 | 1229 | |

← VIRTUAL LU ADDRESS CONFIGURATION

(TIER 2: PAGE MANAGEMENT TABLE)

270

| PAGE NUMBER | LDEV NUMBER | REAL ADDRESS | ASSIGNMENT STATE |
|---|---|---|---|
| 11 | 11 | 110100 | 1 (ASSIGNED) |
| 12 | 11 | 110200 | 0 (UNASSIGNED) |
| 13 | 12 | 110300 | 1 |
| 14 | 12 | 110400 | 1(ASSIGNED)→0(UNASSIGNED) |
| 15 | 13 | 110500 | 1 |
| 16 | 13 | 110600 | 1(ASSIGNED)→0(UNASSIGNED) |

(TIER 2: VIRTUAL LU CONFIGURATION TABLE)

| VIRTUAL LU ADDRESS | PAGE NUMBER | Offset |
|---|---|---|
| ... | .. | |
| 1050 | 13 | 0 |
| 1100 | 13 | 50 |
| 1150 | — | 0 |
| 1200 | 14 | 50 |
| 1250 | 15 | 0 |
| 1300 | 15 | 50 |
| 1350 | — | 0 |
| 1400 | 16 | 50 |

2711　2712　2713　271

STORAGE APPARATUS AND DATA MANAGEMENT METHOD

TECHNICAL FIELD

The present invention relates to a storage apparatus and data management method and is suitably applied to a storage apparatus and data management method capable of switching between block level hierarchical control and file level hierarchical control, for example.

BACKGROUND ART

In recent years, one function that has been installed in storage apparatuses is a virtualization function known as thin provisioning. The thin provisioning function is a function which provides a virtual logical volume (hereinafter called a virtual volume) to a host computer and which, when a request to write data to the virtual volume is supplied from the host computer, dynamically assigns a storage area to the virtual volume. The thin provisioning function affords the benefit of making it possible to provide a virtual volume with a larger capacity than the storage area which can actually be provided to the host computer and making it possible to construct a computer system at low cost by reducing the physical storage capacity in the storage apparatus which is to be pre-prepared.

Furthermore, as a data management method for a storage apparatus which has such a thin provisioning function installed, a hierarchical data management method has conventionally been proposed. The hierarchical data management method manages each of the storage areas provided by storage devices of a plurality of types of varying performance which are installed in the storage apparatus as storage tiers of a plurality of different types, assigns storage areas from high-speed and high-performance storage tiers to areas storing high access frequency data in the virtual volume, and assigns storage areas from low-speed and low-performance storage tiers to areas storing low access frequency data in the virtual volume. With this kind of hierarchical data management method, the cost performance of the storage apparatus can be improved.

Furthermore, types of storage apparatuses include file storage apparatuses which handle data in file units and block storage apparatuses which handle data in block units (page units), where the file storage apparatuses realize file-unit hierarchical control and the block storage apparatuses realize block-unit hierarchical control (PTL1 and PTL2, for example).

CITATION LIST

Patent Literature

PTL 1: Japanese Published Unexamined Application No. 2007-72813
PTL 2: Japanese Published Unexamined Application No. 2011-34525

SUMMARY OF INVENTION

Technical Problem

However, in the hierarchical control of a block storage apparatus, since hierarchical control in file units is impossible, a hierarchical control policy cannot be configured for each user, nor can the hierarchical control policy be configured for each specified file. Furthermore, in hierarchical control in block units (page units), hierarchical control is executed in response to the I/O access frequency for data of the minimal units constituting the blocks (pages), and therefore efficient hierarchical control is not possible. Further, in the hierarchical control of a file storage apparatus, there is a problem in that, even in the case of files where only a tiny percentage of large files such as database files are accessed frequently, the files are placed as is in a high-performance storage tier.

The present invention was conceived in view of the foregoing, and proposes a storage apparatus and data management method with which data can be efficiently managed by switching between block level hierarchical control and file level hierarchical control according to the file characteristics.

Solution to Problem

In order to solve this problem, the present invention is a storage apparatus which is connected via a network to a host computer which requests data writing, comprising storage media of a plurality of types of varying performance; a volume management unit which manages storage areas provided by the storage media of the plurality of types as different storage tiers and manages storage tiers of the same type or different types as a pool, and provides predetermined areas of the pool to the host computer as volumes; and a file management unit which constructs file systems, for managing data in file units configured from a plurality of blocks, in the volumes, and receives file unit data write requests from the host computer, wherein, among a plurality of the file systems, the file management unit migrates data in block units in one of the file systems in the volumes and migrates data in file units in the other of the file systems.

With this configuration, the volume management unit, which manages storage tiers of the same type or different types as a pool and which provides predetermined areas of the pool to the host computer as volumes, and the file systems, which manage data in file units which are configured from a plurality of blocks in the volumes, are constructed, a write request for writing data in file units is received from the host computer, and, among the plurality of file systems, data is migrated in block units to one of the file systems in the volumes, and data is migrated in file units in the other of the file systems. As a result, data can be managed efficiently by switching between block level hierarchical control and file level hierarchical control according to the file characteristics.

Advantageous Effects of Invention

With the present invention, data can be managed efficiently by switching between block level hierarchical control and file level hierarchical control according to the file characteristics.

BRIEF DESCRIPTION OF DRAWINGS

FIG. 4 is a conceptual diagram showing the configuration of a file system according to this embodiment.
FIG. 5 is a table showing the content of an inode management table according to this embodiment.
FIG. 6 is a conceptual diagram showing an inode data block reference example according to this embodiment.

FIG. 9 is a table showing the content of a page management table according to this embodiment.

FIG. 10 is a table showing the content of a virtual volume configuration table according to this embodiment.

FIG. 11 is a table showing the content of a real address management table according to this embodiment.

FIG. 14 is a table showing the content of the inode management table according to this embodiment.

FIG. 15 is a table showing the content of the inode management table according to this embodiment.

FIG. 17 is a table showing the content of the page management table according to this embodiment.

FIG. 19 is a table showing the inode management table according to this embodiment.

FIG. 21 is a table showing the content of the inode management table according to this embodiment.

FIG. 22 is a table showing the content of the file management table according to this embodiment.

FIG. 23 is a table showing the content of the inode management table according to this embodiment.

FIG. 24 is a table showing the content of a virtual LU configuration table according to this embodiment.

FIG. 25 is a table showing the content of a page management table according to this embodiment.

FIG. 26 is a table showing the content of the inode management table according to this embodiment.

FIG. 28 is a table showing the content of a page management table according to this embodiment.

FIG. 30 is a table showing the content of a page management table according to this embodiment.

FIG. 31 is a table showing the content of a virtual LU configuration table according to this embodiment.

FIG. 34 is a table showing the content of a page management table according to this embodiment.

FIG. 35 is a table showing the content of a virtual LU configuration table according to this embodiment.

FIG. 36 is a table showing the content of a page management table according to this embodiment.

FIG. 38 is a table showing the content of a file management table according to this embodiment.

FIG. 40 is a table showing the content of a file migration management table according to this embodiment.

FIG. 41 is a table showing the content of a page management table according to this embodiment.

FIG. 44 is a table showing the content of a page management table according to this embodiment.

FIG. 45 is a table showing the content of a virtual LU configuration table according to this embodiment.

FIG. 46 is a table showing the content of an inode management table according to this embodiment.

FIG. 47 is a table showing the content of an inode management table according to this embodiment.

FIG. 49 is a table showing the content of a file block configuration list according to this embodiment.

FIG. 51 is a table showing the content of a file management table according to this embodiment.

FIG. 52 is a table showing the content of a file migration management table according to this embodiment.

FIG. 53 is a table showing the content of a page management table according to this embodiment.

FIG. 54 is a table showing the content of a virtual LU configuration table according to this embodiment.

FIG. 55 is a table showing the content of an inode management table according to this embodiment.

FIG. 56 is a table showing the content of a page management table according to this embodiment.

FIG. 57 is a table showing the content of a virtual LU configuration table according to this embodiment.

FIG. 58 is a table showing the content of an inode management table according to this embodiment.

FIG. 61 is a table showing the content of a file management table according to this embodiment.

FIG. 62 is a table showing the content of a file migration management table according to this embodiment.

FIG. 63 is a table showing the content of a page management table according to this embodiment.

FIG. 65 is a table showing the content of an inode management table according to this embodiment.

FIG. 66 is a table showing the content of a page management table according to this embodiment.

FIG. 67 is a table showing the content of a virtual LU configuration table according to this embodiment.

DESCRIPTION OF EMBODIMENTS

An embodiment of the present invention will be described in detail hereinbelow with reference to the drawings.

(1) Overview of the Embodiment

The types of storage apparatus include a file storage apparatus which handles data in file units and a block storage apparatus which handles data in block units (page units). The file storage apparatus realizes file unit hierarchical control and the block storage apparatus realizes block unit hierarchical control.

However, in the hierarchical control of the block storage apparatus, hierarchical control in file units is impossible, and since hierarchical control in file units is impossible, a hierarchical control policy cannot be configured for each user, nor can the hierarchical control policy be configured for each specified file. Furthermore, in hierarchical control in block units (page units), hierarchical control is executed in response to the I/O access frequency for data of the minimal units constituting the blocks (pages), and therefore efficient hierarchical control is not possible. Further, in the hierarchical control of a file storage apparatus, there is a problem in that, even for files where only a tiny percentage of long files such as database files are accessed frequently, these files are placed as is in a high-performance storage tier.

Figure 1:
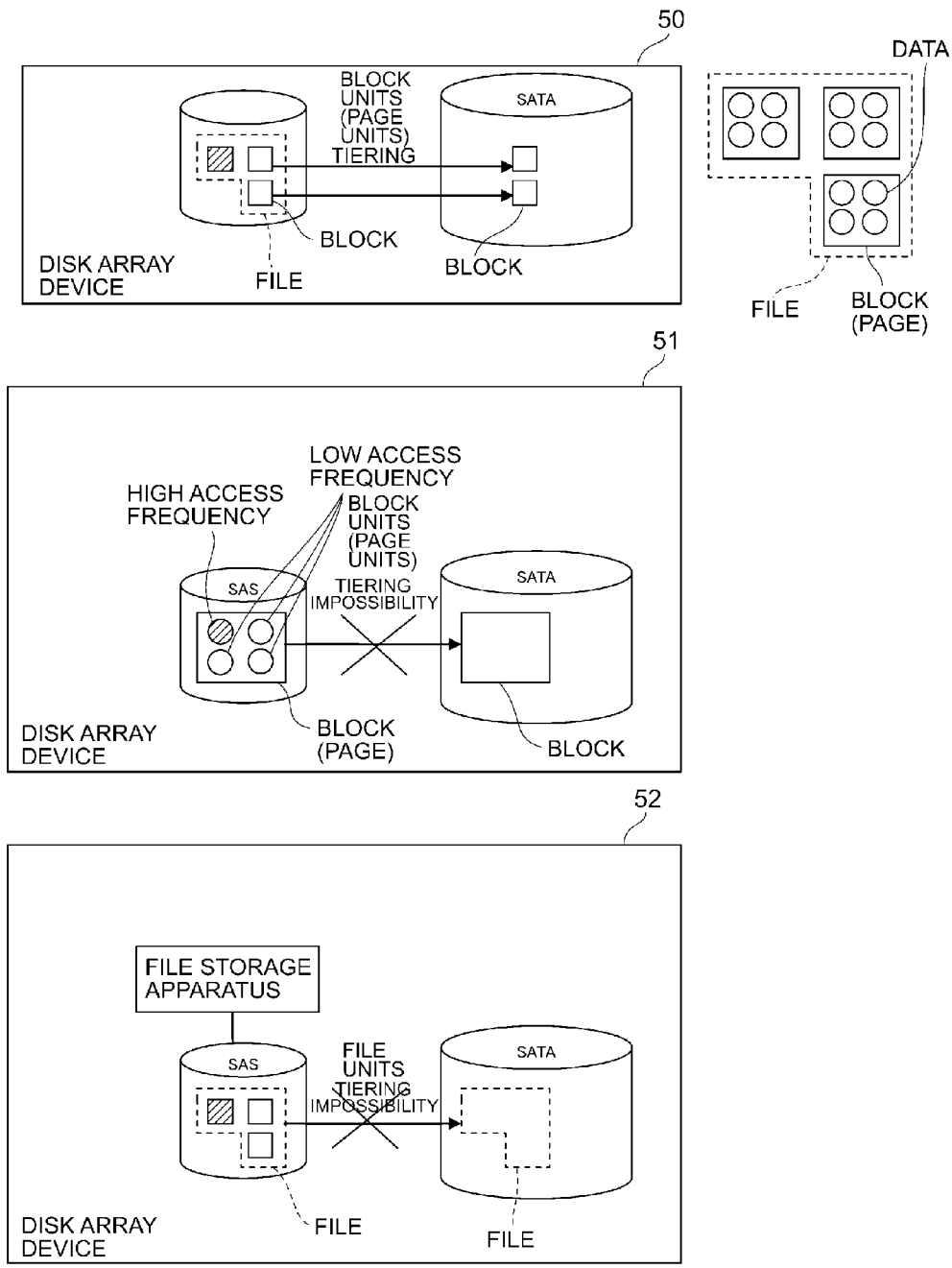
FIG. 1 is an explanatory diagram providing an overview of one embodiment of the present invention.

The hierarchical control problems with the block storage apparatus or file storage apparatus will now be described with reference to FIG. 1. Explanatory diagrams 50 and 51 in FIG. 1 indicate block unit (page unit) hierarchical control and explanatory diagram 52 denotes file unit hierarchical control.

For example, in the hierarchical control of the block storage apparatus, since block unit (page unit) hierarchical control is performed, hierarchical control cannot be performed by configuring a policy in file units. As illustrated in explanatory diagram 50, among the files which are configured from a plurality of blocks (pages), if the access frequency of some of the blocks (pages) is low and the access frequency of other blocks (pages) is high, data is migrated to a low performance storage medium only for some of the blocks (pages) of a low access frequency. As a result, even in the case of data which needs to be handled in file units, with page unit hierarchical control, only some of the files are migrated to another storage medium.

Furthermore, since hierarchical control is executed in block units (page units), hierarchical control of a plurality of data which constitute a page affects either one of the plurality of data constituting the page. For example, if, as shown in explanatory diagram 51, the access frequency of one data item among the four data contained in a block (page) is high and the access frequency of the other data is low, the data with the high access frequency has an influence and, in page-unit hierarchical control, data cannot be migrated to a storage medium with a lower performance tier than the current tier.

In addition, in the hierarchical control of the file storage apparatus, since hierarchical control in file units is performed, as shown in the explanatory diagram 52, even for files where only a tiny percentage of long files such as database files are accessed frequently, these files are placed as is in a high-performance storage tier.

Therefore, in this embodiment, hierarchical control processing can be divided into two stages, and file level hierarchical control or block level hierarchical control can be executed depending on the file characteristics. For example, in order to be able to preconfigure a policy for determining file characteristics, it is determined whether file level hierarchical control should be executed or block level hierarchical control should be executed according to the policy. In addition, in file level hierarchical control and block level hierarchical control, the I/O characteristic is detected and a switch from file level hierarchical control to block level hierarchical control is made, and a switch from block level hierarchical control to file level hierarchical control is made. As a result, data can be efficiently managed by switching between file level hierarchical control and block level hierarchical control according to the file characteristics.

(2) Hardware Configuration of Storage System

Figure 2:
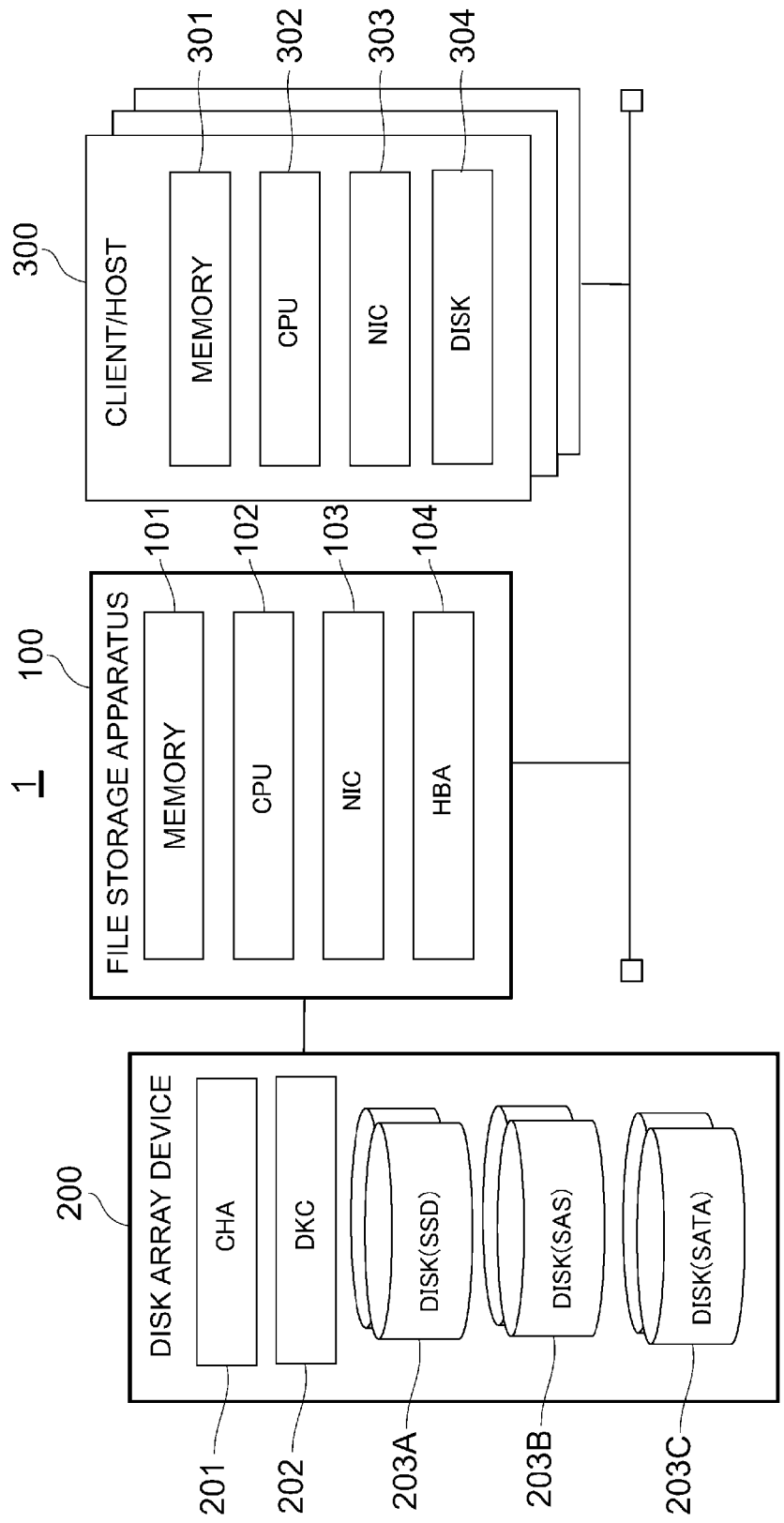
FIG. 2 is a block diagram showing a hardware configuration of a storage system according to this embodiment.

FIG. 2 shows the hardware configuration of a storage system 1. The storage system 1 mainly comprises a file storage apparatus 100 which provides files to a client/host 300, and a disk array device 200 which controls data writing to a plurality of hard disk drives (HDD).

In this embodiment, the file storage apparatus 100 and disk array device 200 are configured as separate devices but the present invention is not limited to this example, rather, the file storage apparatus 100 and disk array device 200 may also be configured as an integral storage apparatus.

The file storage apparatus 100 comprises a memory 101, a CPU 102, a network interface card (abbreviated as NIC in the drawing) 103, and a host bus adapter (abbreviated as HBA in the drawing) 104, and the like.

The CPU 102 functions as an arithmetic processing device and controls the operation of the file storage apparatus 100 according to programs and arithmetic parameters which are stored in the memory 101. The network interface card 103 is an interface for communicating with the client/host 300 and disk array device (not shown) via a network. Furthermore, the host bus adapter 104 connects the disk array device 200 to the file storage apparatus 100 and the file storage apparatus 100 executes access in block units to the disk array device 200 via the host adapter 104.

The disk array device 200 is configured from a channel adapter (abbreviated to CHA in the drawings) 201, a disk controller (abbreviated to DKC in the drawings) 202, and a plurality of hard disk devices (abbreviated to DISK in the drawings) 203A, 203B, 203C (hereinafter sometimes also referred to as the hard disk devices 203).

The disk array device 200 receives an I/O request, transmitted from the host bus adapter 104 of the file storage apparatus, via the channel adapter 201, and, based on control by the disk controller 202, executes I/O processing by selecting a suitable hard disk device 203 from among the plurality of hard disk devices 203 via the interface.

The hard disk devices 203 are configured from semiconductor memory such as SSD (Solid State Drive), high-cost, high-performance disk devices such as SAS (Serial Attached SCSI) disks or FC (Fibre Channel) disks, and low-cost, low-performance disk devices such as SATA (Serial AT Attachment) disks. Among the types of hard disk devices 203, the most reliable and highest response performance devices are the SSD, the devices with the next highest reliability and response performance are the SAS disks, and the least reliable and lowest performance devices are the SATA disks. In this embodiment, the hard disk devices 203A are SSD, the hard disk devices 203B are SAS disks, and the hard disk device 203C are SATA disks.

The client/host 300 comprises a memory 301, a CPU 302, a network interface card (abbreviated to NIC in the drawings) 303, and a disk (abbreviated to DISK in the drawings) 304, and the like.

The client/host 300 reads a program, for controlling the client/host 300 such as an OS which is stored on the disk 304, to the memory 301, and causes the CPU 302 to run the program. Furthermore, the client/host 300 uses the network interface card 303 to communicate with the file storage apparatus 100 which is connected via the network and executes file unit access.

(3) Software Configuration of Storage System

Figure 3:
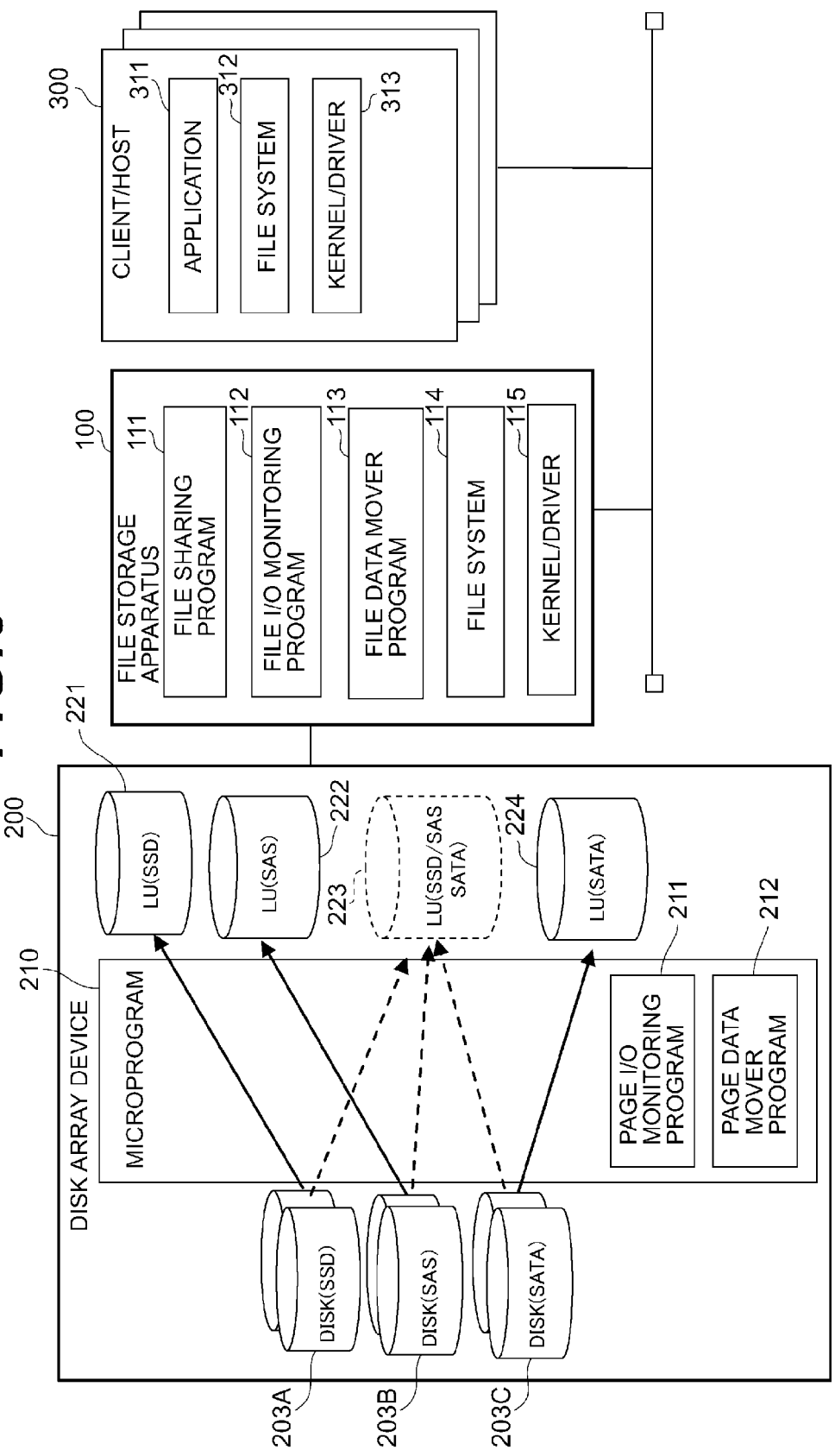
FIG. 3 is a block diagram showing a software configuration of the storage system according to this embodiment.

The software configuration of the storage system 1 will be explained next. As shown in FIG. 3, the memory 202 of the file storage apparatus 100 stores a file sharing program 111, a file I/O monitoring program 112, a file data mover program 113, a file system 114, and a kernel/driver 115, or the like.

The file sharing program 111 is a program which uses a communication protocol such as a CIFS (Common Internet File System) or NFS (Network File System) in order to provide a file sharing system [for sharing files] with the client/host 300.

The file I/O monitoring program 112 is a program which collects the access counts for each file and stores the access counts in a file management table which will be described subsequently. It is thus possible to determine whether file level migration is to be performed by ascertaining what the file access load is. Furthermore, a file block configuration list for managing the configurations of the file block types is created. It is possible to determine whether a switch from block level hierarchical control to file level hierarchical control can be made on the basis of the file block configuration list.

The file data mover program 113 is a program which executes file level hierarchical control. This program 113 also performs switching from block level hierarchical control to file level hierarchical control and switching from file level hierarchical control to block level hierarchical control. When executing the file level hierarchical control, the file data mover program 113 executes hierarchical control on the basis of policies that are preconfigured by the user, the remaining capacities of the file systems, and the access counts collected by the file I/O monitoring program 112.

The file system 114 is a program which manages the logical structure that is constructed in order to realize management units such as files in the volume. The file systems managed by the file system 114 are, as shown in FIG. 4, configured from a superblock 121, an inode management table 122, and a data block 123, or the like.

The superblock 121 is an area in which information of the whole file system is collectively held. The information of the whole file system is, for example, the size of the file system and the unused capacity of the file system.

The inode management table 122 is a table for managing inodes which are associated with single directories and files. When an inode storing files is accessed, a directory entry containing only directory information is used. For example, if a file defined as "home/user-01/a.txt" is accessed, a data block is accessed by tracking the inode number associated with the directory, as shown in FIG. 5. In other words, a data block "a.txt" can be accessed by tracking the inode numbers in the order "2 to 10 to 15 to 100".

As shown in FIG. 6, the inode associated with the file entity "a.txt" stores information such as the file ownership rights, access rights, file size, and data storage point. The reference relationship between inodes and data blocks will now be described. As shown in FIG. 6, "100", "200", and "250" in the drawings denote block addresses. Furthermore, "3", "2", and "5" which are associated with these block addresses indicate the number of blocks from the addresses. Data is stored in this number of blocks.

Figure 7:
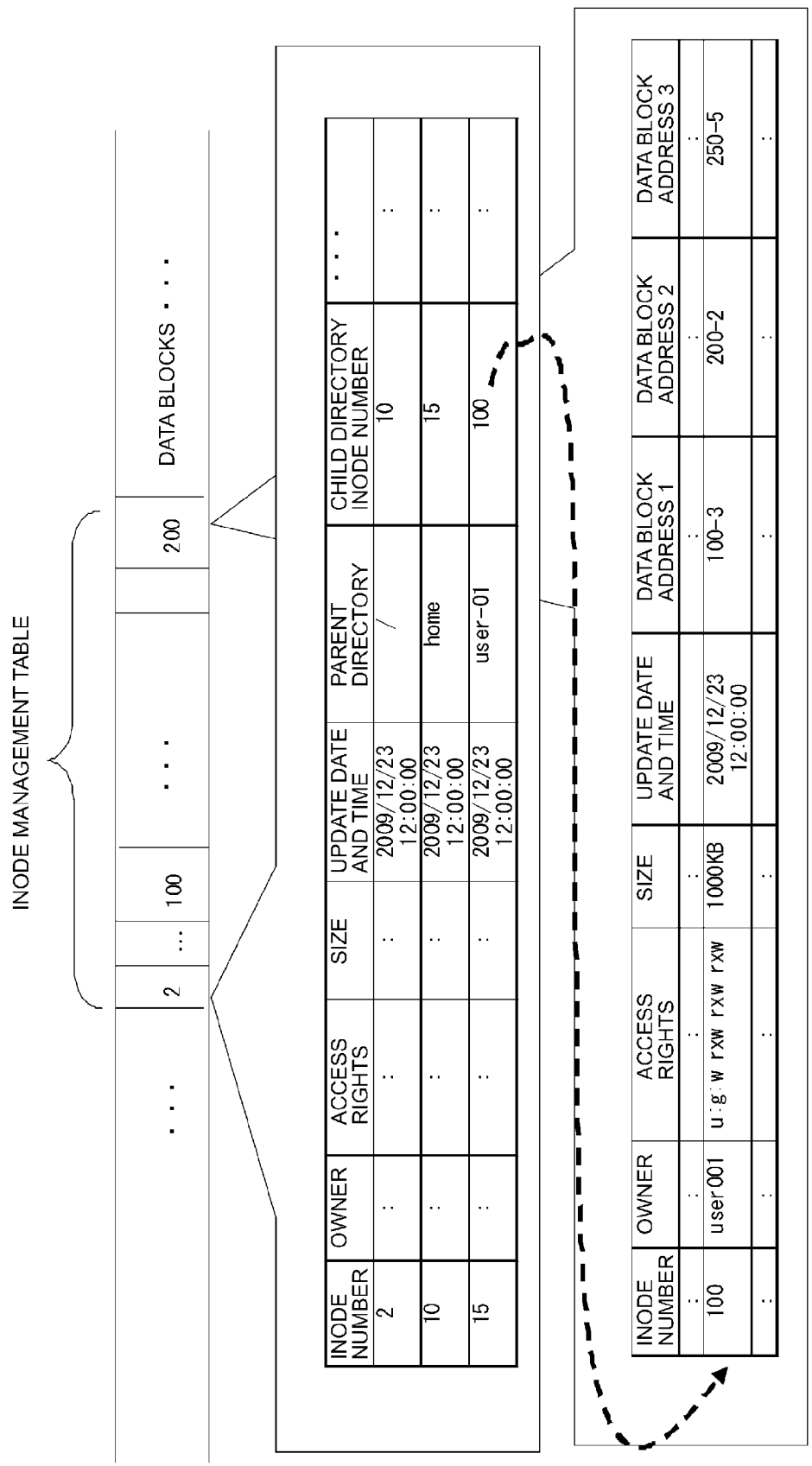
FIG. 7 is a conceptual diagram showing details of an inode management table according to this embodiment.

In addition, these inodes are stored in the inode management table as shown in FIG. 7. That is, an inode associated with only a directory stores an inode number, an update date and time, and the inode numbers of the parent directory and child directory. Furthermore, an inode which is associated with a file entity stores information such as the owner, access rights, file size, and data block address in addition to the inode number, update date and time, and the parent directory and child directory. The foregoing inode management table is a general table and details of the inode management table according to this embodiment will be described in detail subsequently.

Returning to FIG. 4, the data block 123 is a block for storing actual file data and management data. Going back to FIG. 9, the kernel/driver 115 of the file storage apparatus 100 is a program which performs general control of the file storage apparatus 100 as well as hardware-specific control, i.e. which controls scheduled control of a plurality of programs operating in file storage, controls hardware interrupts, and performs block unit I/O to/from the storage devices.

Returning to FIG. 3, the memory (not shown) of the disk array device 200 stores a microprogram 210. The microprogram 210 receives I/O requests transmitted from the host bus adapter 104 of the file storage apparatus 100 via the channel adapter 201, selects a suitable hard disk device 203 from among a plurality of hard disk devices 203 via an interface on the basis of control by the disk controller 202, and executes I/O processing. The plurality of hard disk devices 203 are managed as a single RAID group and, by sequestering a partial area of the RAID group, a single LDEV is created and provided as an LU (logical volume) to the client/host 300 which is connected to the disk array device 200.

The page I/O monitoring program 211 is a program which collects the access count for each block (page) and stores the access counts in a page access management table (described subsequently). As a result, it is possible to find the access count for each block (page) and determine whether to perform block (page) level migration. The page data mover program 212 is a program which executes block level hierarchical control. The page data mover program 212 executes block level hierarchical control on the basis of the access counts collected by the page I/O monitoring program 211.

Figure 8:
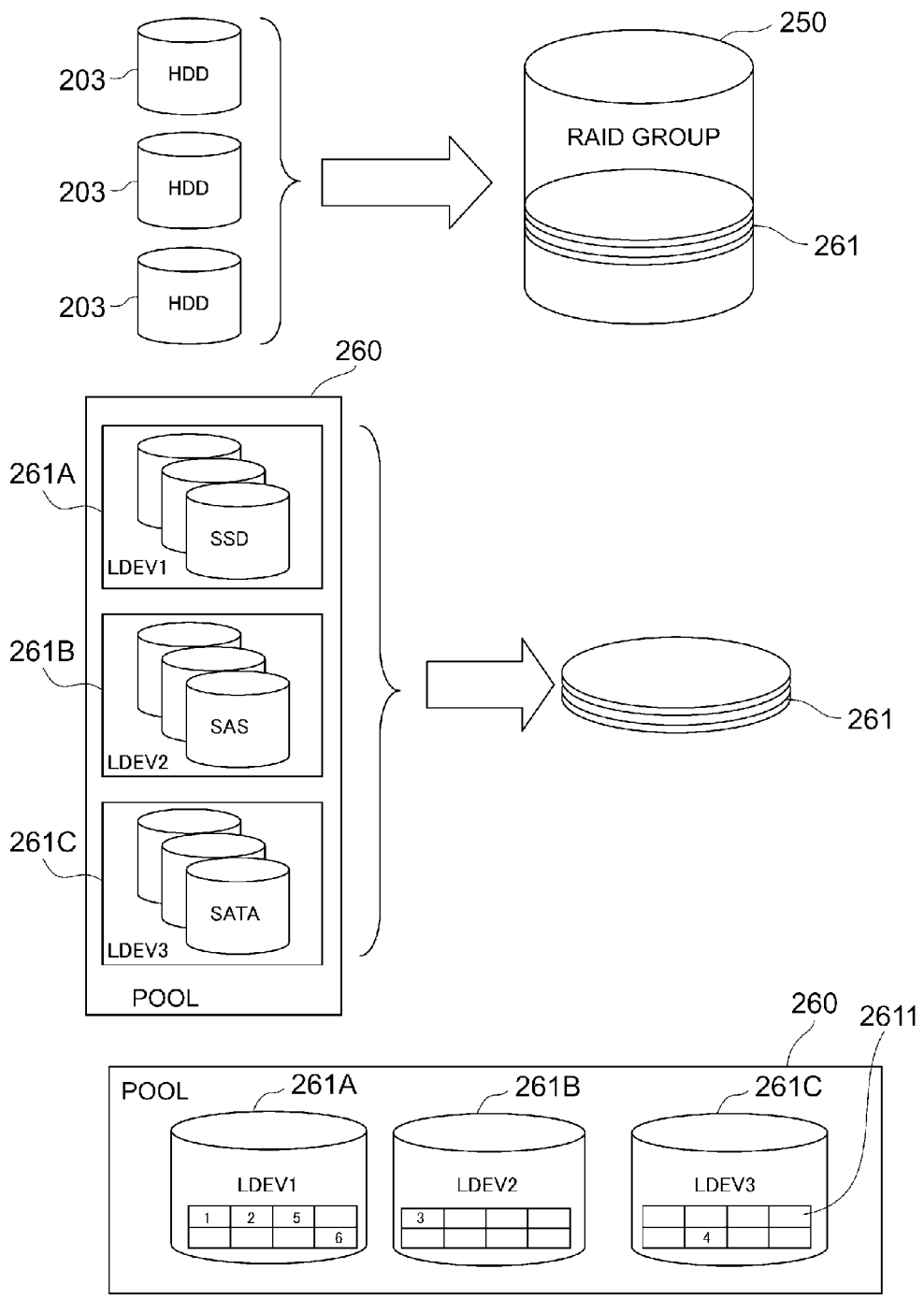
FIG. 8 is a conceptual diagram illustrating logical volumes according to this embodiment.

Here, the logical volumes provided by the disk array device 200 will be described with reference to FIG. 8. As shown in FIG. 8, the disk array device 200 handles a RAID group configured from a plurality of hard disk drives 203 as a single logical volume 250 and manages the logical volumes as a pool 260. A plurality of logical volumes (LDEV) 261A to 261C exist in the pool 260 and the logical volumes (LDEV) 261 in the pool 260 are managed in page (storage areas of fixed length) 2611 units.

In this embodiment, as described earlier, among SSD, SAS, and SATA, the device with the most reliable and highest response performance is SSD, the device with the next highest reliability and response performance is the SAS disk, and the least reliable and lowest performance device is the SATA disk. For example, the pool 260 contains an LDEV1, configured from an SSD which is the most reliable and has the highest response performance, an LDEV2, which is configured from SAS which has the next highest reliability and response performance, and an LDEV3, which is configured from SATA, the least reliable device with the lowest response performance.

Page numbers identifying each of the pages are assigned to each of the pages 2611, and the page numbers are mapped to the page management table 270 in association with logical volume numbers (LDEV numbers) and real addresses in the logical volumes. The page management table 270 is a table which manages the mapping and assignment states of pages of the logical volumes and, as shown in FIG. 9, is configured from a page number field 2701, an LDEV number field 2702, a real address field 2703, and an assignment state field 2704.

The page number field 2701 stores page numbers of logical volumes. The LDEV number field 2702 stores numbers identifying the logical volumes. The real address field 2703 stores real addresses in the logical volumes. The assignment state field 2704 stores information identifying whether a virtual volume, described subsequently, has been assigned, and stores a flag "1" indicating assignment if a virtual volume has already been assigned and stores a flag "0" indicating non-assignment if a virtual volume has not yet been assigned.

Meanwhile, a virtual volume to which a storage area has not been assigned is provided to a host (user). The virtual volume is managed by a virtual volume configuration table 271 which maps the addresses and page numbers of the virtual volumes.

As shown in FIG. 10, the virtual volume configuration table 271 is configured from a virtual LU address field 2711, a page number field 2712 and an offset field 2713. The virtual LU address field 2711 stores virtual volume addresses. The page number field 2712 stores logical volume page numbers. The offset field 2713 stores the differences from the real addresses which correspond to the page numbers.

Upon receiving a write request to write to a virtual volume from the client/host 300, the disk array device 200 refers to the virtual volume configuration table 271 and specifies the page number and offset corresponding to the virtual LU address which is received from the client/host 300. Further, if the specified page number has been configured, the disk array device 200 refers to the page management table 270, acquires the LDEV number and real address, adds the offset to the real address, and stores the data in the storage area corresponding to this address. If a page number has not been configured, the disk array device 200 retrieves the number of a page to which an assignment state has not yet been assigned from the page management table 270, acquires the LDEV number and real address corresponding to the page number, and writes the data to the storage area corresponding to the real address. The disk array device 200 updates the value of the assignment state field 2704 in the page management table 270 from unassigned "0" to assigned "1" and stores the page number configured in the page number field 2712 of the virtual LU configuration table 271.

In addition, when a write request designating a logical volume number (LDEV number) and real address is generated in the disk controller 202 of the disk array device 200, the disk array device 200 refers to the real address management table 272 created for each logical volume and executes write processing by specifying the hard disk device and physical address.

As shown in FIG. 11, the real address management table 272 is configured from a real address field 2721, a HDD number field 2722, and a physical address field 2723. The real address field 2721 stores real addresses of logical volumes. The HDD number field 2722 stores numbers identifying hard disk devices 203. The physical address field 2723 stores physical addresses of the hard disk devices 203 which correspond to the real addresses stored in the real address field 2721.

Figure 12:
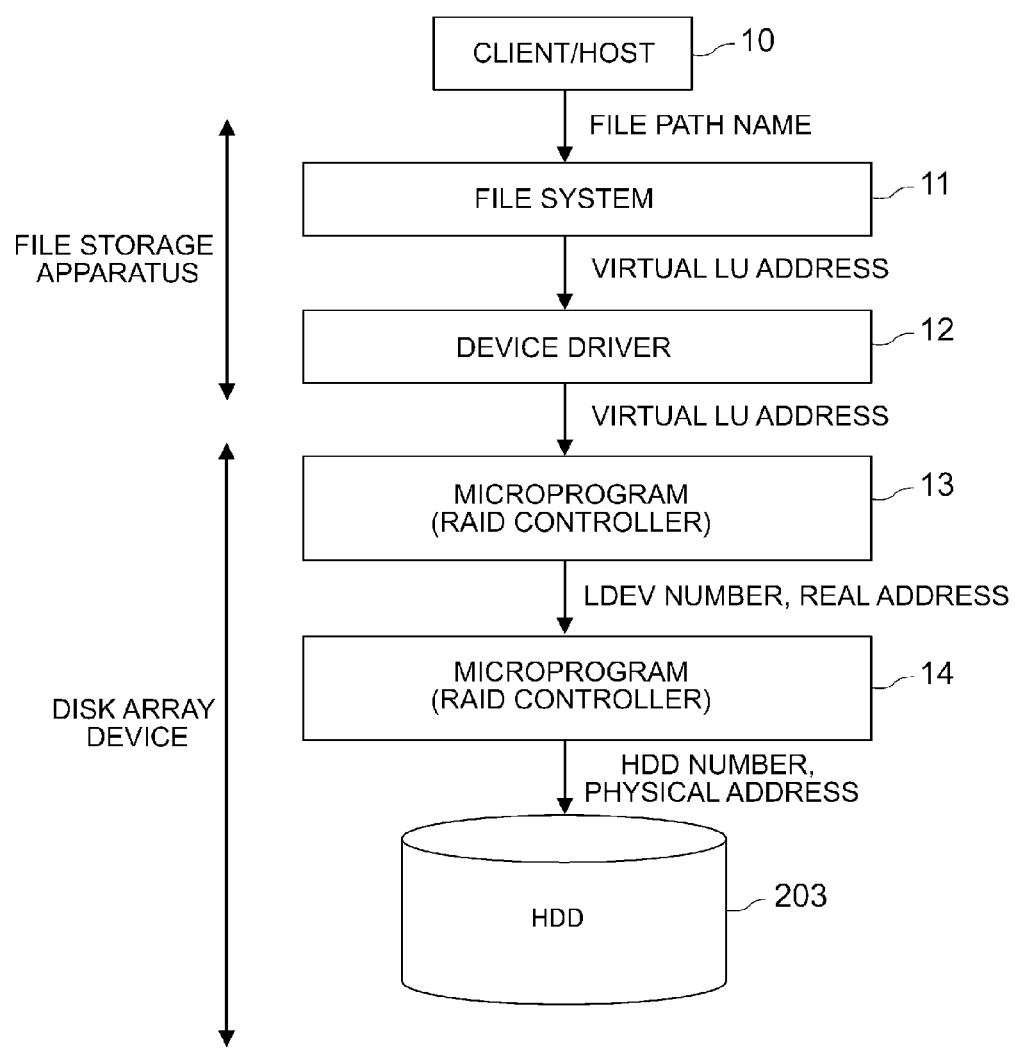
FIG. 12 is a conceptual diagram illustrating a file system according to this embodiment.

Here, the typical flow of processing between the hard disk devices 203 to which data is actually written from the file system 114 will be described. As shown in FIG. 12, a data read/write request is first issued by the user/host 50 by designating a file path name. Upon receiving the file unit read/write request (11), the file system refers to the inode management table 122 and converts the access destination file path name into a block address (virtual LU address) and notifies the device driver (12). The device driver then performs read/write processing on the disk array device 200 (13). More specifically, the microprogram 210 of the disk array device 200 which receives the virtual LU address refers to the virtual LU configuration table 271 and the page management table 270 and specifies an LDEV number and a real address. In addition, the microprogram 210 of the disk array device 200 refers to the real address management table 272, converts the LDEV number and real address into a HDD number and a physical address (14), and executes data read/write processing on the storage area specified by the HDD number and physical address.

(4) Overview of Storage System Processing

Figure 13:
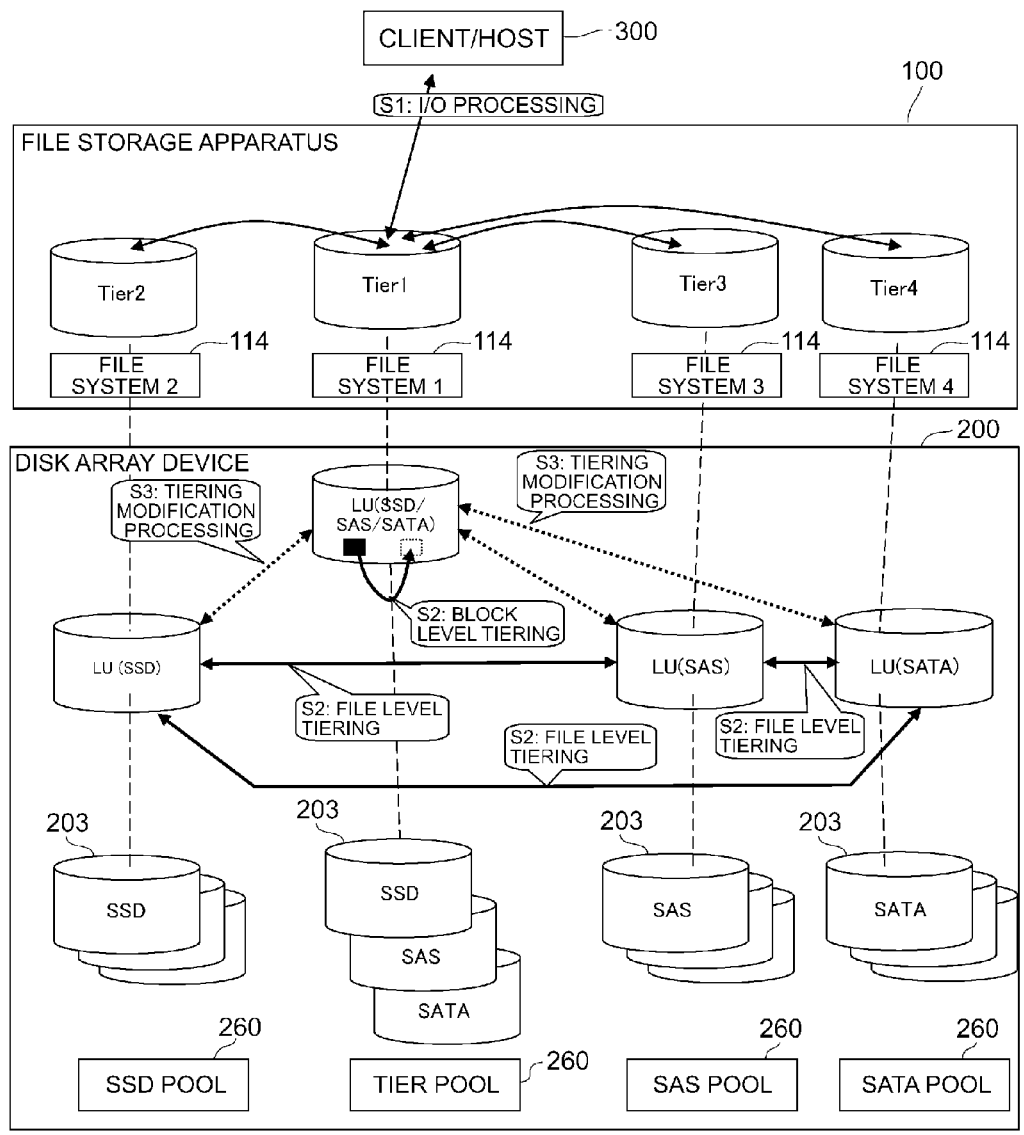
FIG. 13 is a conceptual diagram illustrating an overview of processing of the storage system according to this embodiment.

An overview of the processing of storage system 1 will be described next with reference to FIG. 13. In this embodiment, the following three processes will be explained in particular detail.

(4-1) I/O Processing (4-2) Hierarchical Control (Block Level Hierarchical Control, File Level Hierarchical Control)

(4-3) Hierarchical Control Switching (Switching from Block Level Hierarchical Control to File Level Hierarchical Control, and Switching from File Level Hierarchical Control to Block Level Hierarchical Control)

In this embodiment, it is assumed that logical volumes (LU) configured from a mixture of SSD, SAS, and SATA are Tier 1, that logical volumes (LU) configured from SSD are Tier 2, logical volumes (LU) configured from SAS are Tier 3, and logical volumes (LU) configured from SATA are Tier 4.

(4-1) I/O Processing

First, the basic data I/O processing (S1) of the storage system 1 will be described. As shown in FIG. 13, the file storage apparatus 100 receives a read/write request from the client/host 300. The file storage apparatus 100 which receives the read/write request performs file access on Tier 1. Tier 1 are logical volumes on which block level hierarchical control is executed by the disk array device 200.

The file storage apparatus 100 checks the inode information contained in the read/write request and executes normal data I/O processing if the data corresponding to the inode information is in Tier 1. If, however, the data corresponding to the inode information is located outside Tier 1, the file storage apparatus 100 issues a data processing request to the file system of the relevant tier.

In this embodiment, the inode management table 122 is expanded to create a Tier 1 inode management table 122A. As shown in FIG. 14, a stubbing flag field 1226, a migration destination tier number field 1227 and a migration destination inode number field 1228 are added to the inode management table 122A. The stubbing flag field 1226 stores information indicating whether a file has been stubbed. Here, stubbing does not refer to the storage of real data, rather, only the storage of reference information for the storage point of the real data. For example, in this embodiment, stubbing is performed by storing only reference information for the data storage point in Tier 1, and the real data is stored outside Tier 1. For example, if a file has been stubbed, "ON" is stored in the stubbing flag field 1226, whereas if a file has not been stubbed, "OFF" is stored therein.

The migration destination tier number field 1227 stores a number identifying the migration destination tier. If a file has been stubbed and the file is stored in the migration destination tier (file system), the migration destination tier number is stored in the migration destination tier number field 1227. Further, if a file is stubbed and the file is stored in the migration destination tier (file system), the inode number of the migration destination file system is stored in the migration destination inode number field 1228.

Further, as shown in FIG. 15, the inode management tables 122B of Tiers 2 to 4 are the same as the typical inode management table described above and therefore will not be described in detail here.

For example, the file storage apparatus 100 references the stubbing flag to determine whether the file corresponding to the inode information contained in the read/write request has been stubbed. If the stubbing flag is "ON" the file storage apparatus 100 executes data processing on the file system of the corresponding tier by checking the migration-destination tier number and inode number.

(4-2) Hierarchical Control

Block level hierarchical control and file level hierarchical control (S2) will be described next.

(4-2-1) Block Level Hierarchical Control

Block level hierarchical control is executed on Tier 1. In other words, a tier determination to determine whether it is necessary to migrate data for each Tier 1 block (page) is executed and hierarchical control is performed. In block level hierarchical control, data migration between LU (file system) is not generated. Furthermore, performance is monitored in page units and, at fixed intervals or if the unused capacity of the storage area exceeds a threshold value, pages requiring migration are defined on the basis of the monitoring information and preconfigured policy. Further, data is actually migrated to the defined migration destination. If data is migrated between storage tiers, the page management table 270 is updated.

(4-2-2) File Level Hierarchical Control

File level hierarchical control is executed in Tiers 2, 3, and 4. In other words, a tier determination of whether it is necessary to migrate data for each of the files of Tiers 2 to 4 is executed and hierarchical control is performed. In file level hierarchical control, data migration between LU (file systems) is generated. Furthermore, performance is monitored in file units and, at fixed intervals or if the unused capacity of the storage area exceeds a threshold value, files requiring migration are defined on the basis of the monitoring results and predetermined policy. In addition, if the unused capacity of the storage area exceeds a threshold, files requiring migration are defined on the basis of the monitoring information and the preconfigured policy. Further, files are actually migrated to the defined migration destination. If data is migrated between storage tiers, the migration-destination tier number 1227 and the migration-destination inode number 1228 in the inode management table are changed.

(4-3) Hierarchical Control Switching

Hierarchical control switching processing (S3) will be described next.

(4-3-1) Switching from Block Level Hierarchical Control to File Level Hierarchical Control.

The file storage apparatus 100 inspects the usage of file blocks at regular intervals and copies same to a file block configuration list 150 (described subsequently). Furthermore, at regular intervals or if the threshold of the unused capacity is exceeded, files are migrated between storage tiers by defining the files which require switching from block level hierarchical control to file level hierarchical control on the basis of the file block configuration list and predetermined policy. If files are migrated between storage tiers, the stubbing flag of the inode management table is turned "ON" and the migration-destination tier number field 1227 and the migration-destination inode number field 1228 in the inode management table are changed.

(4-3-2) Switching from File Level Hierarchical Control to Block Level Hierarchical Control In file level hierarchical control, the migration status is copied to the file list each time file migration occurs between storage tiers. At regular intervals or if the unused capacity exceeds the threshold, the files requiring switching from file level hierarchical control to block level hierarchical control are defined on the basis of the file list and predetermined policy and the files are migrated between the storage tiers. If the files are migrated between the storage tiers, the Tier 1 inodes and data blocks are reserved and the data block addresses are configured in the inode management table 122.

(5) Details of Storage System Processing (5-1) I/O Processing

The file storage apparatus 100 receives a read/write request from the client/host 300 and performs file access for Tier 1. Tier 1 are the logical volumes (LU) on which block level hierarchical control is performed by the disk array device 200. If the data targeted by the read/write request is stored in Tier 1, I/O processing is executed as usual. Furthermore, as a result of file level hierarchical control, if data has already been migrated from Tier 1 to a tier other than Tier 1, I/O processing is executed in the migration destination tier.

(5-1-1) New File Write Processing

Figure 16:
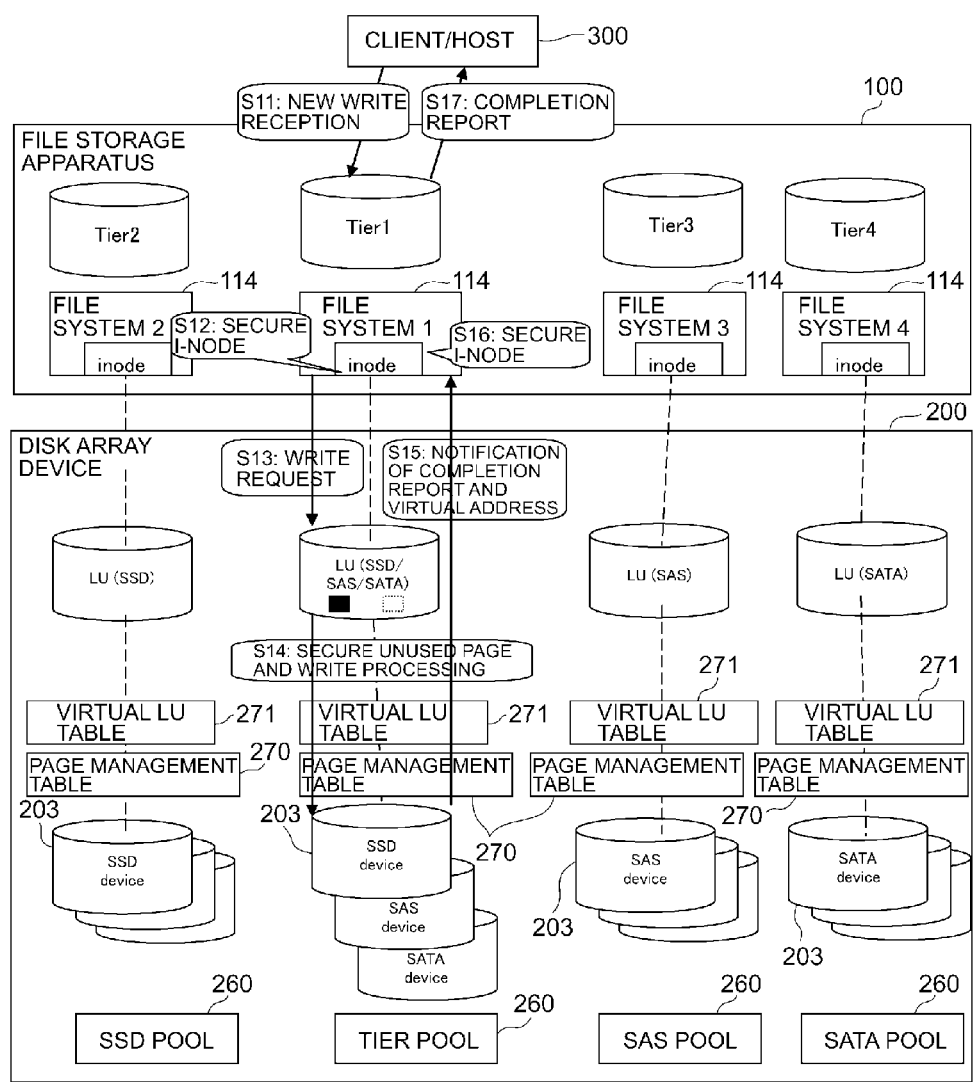
FIG. 16 is a conceptual diagram illustrating write processing of a new file according to this embodiment.

New file write processing to which a storage area has not yet been assigned will be described first. As shown in FIG. 16, the file storage apparatus 100 receives a new file write request from the client/host 300 (S11). The file storage apparatus 100 which receives the new file write request reserves the inode of the Tier 1 (file system 1) (S12). More specifically, the file storage apparatus 100 reserves the new inode number for Tier 1 (file system 1) and updates the inode management table 122A for Tier 1.

Furthermore, the file system 1 of the file storage apparatus 100 issues a write request to the disk array device 200 (S13).

Figure 18:
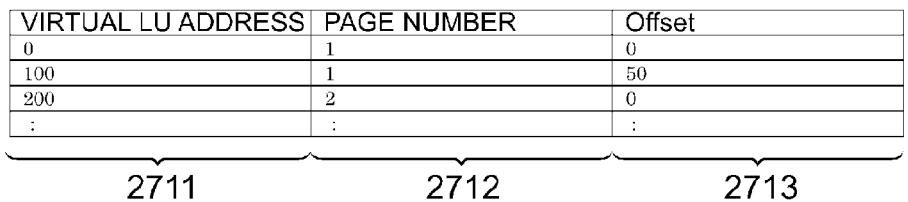
FIG. 18 is a table showing the content of a virtual LU configuration table according to this embodiment.

The disk array device 200 retrieves a page number for which the assignment state is unassigned from the Tier 1 page management table 270 and executes write processing by acquiring the LDEV number and real address which correspond to the page number (S14). FIG. 17 shows an example of a Tier 1 page management table 270. In the case of FIG. 17, it can be seen that the LDEV number corresponding to the page numbers 1 and 2 for which the assignment state field 1704 is "0" (unassigned) is "1" and that the real addresses are "100000" and "100100". The disk array device 200 changes the assignment states in the Tier 1 page management table 270 from "0" (unassigned) to "1" assigned and updates the Tier 1 virtual LU configuration table 271. FIG. 18 shows an example of the Tier 1 virtual LU configuration table 271. In the case of FIG. 18, the page number field 2712 shows that the page numbers (1 and 2) reserved in the page management table 270 have been configured.

Returning to FIG. 16, the disk array device 200 issues notification to file system 1 of the write processing completion report and virtual LU address (S15).

The file system 1 of the file storage apparatus 100, to which notification of the completion report and virtual LU address was issued by the disk array device 200, updates the inode management table 122A (S16). More specifically, the file system 1 configures the virtual LU address, for which notification was issued, in the data block address field 1229 of the inode management table 122A.

FIG. 19 shows an example of the inode management table 122A. In the case of FIG. 19, it can be seen that the virtual LU address (200) notified in step S15 is stored in the data block address field 1229.

Returning to FIG. 16, the file system 1 of the file storage apparatus 100 reports that new data write processing is complete to the client/host 300 (S17).

(5-1-2) Existing File Read/Write Processing

Read/write processing of existing files to which a storage area has already been assigned will be described next.

(5-1-2-1) Read/Write Processing after Tier Migration

Figure 20:
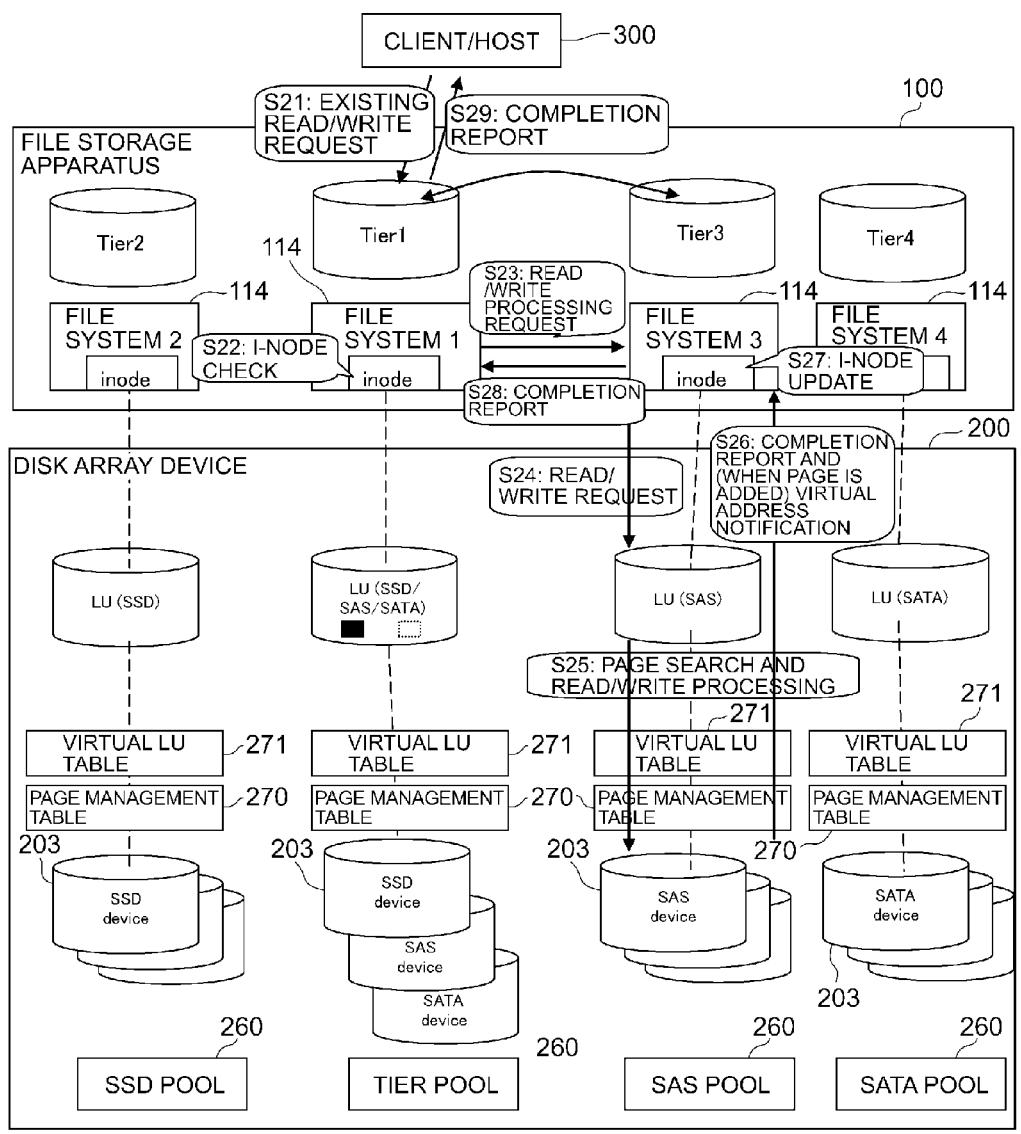
FIG. 20 is a conceptual diagram showing read/write processing after tier migration according to this embodiment.

Read/write processing after tier migration will first be described. After tier migration denotes a state where hierarchical control processing has been executed for files stored in Tier 1 and such files have been migrated to a tier other than Tier 1. FIG. 20 illustrates read/write processing in a case where files have been migrated from Tier 1 to Tier 3. Read/write processing in a case where files have been migrated from Tier 1 to Tier 2 is also the same.

As shown in FIG. 20, the file storage apparatus 100 receives a read/write request for an existing file from the client/host 300 (S21). The file storage apparatus 100 which receives a read/write request for an existing file checks the inode number contained in the received read/write request from the inode management table 122A of Tier 1 (file system 1) (S22). Furthermore, the file storage apparatus 100 checks the stubbing flag 1226, migration-destination tier number 1227, and the migration-destination inode number 1228 in the Tier 1 inode management table 122A and determines whether the file is in Tier 1 or has been migrated to a tier other than Tier 1.

FIG. 21 shows an example of the Tier 1 inode management table 122A. In the case of FIG. 21, it can be seen that, for the file with inode number 2, a flag "1" indicating that the file is stubbed is configured and that the migration-destination tier number is "3" and the migration-destination inode number is "3010."

Returning to FIG. 20, the file system 1 increases the access count of the file management table 130 and requests that the file system 3 perform read/write processing (S24).

The file management table 130 is a table which manages files in the file storage apparatus 100 and, as shown in FIG. 22, is configured from a file number field 1301, a file name field 1302, a current tier field 1303, an inode field 1304, an access count field 1305, and a tiering-enabled range field 1306. The file number field 1301 stores numbers uniquely identifying files. The file name field 1302 stores the file names corresponding to the file numbers. The current tier field 1303 stores the numbers of the tiers where the current files are stored. The inode field 1304 stores inode numbers. The access count field 1305 stores the number of accesses by the client/host 300. The tiering-enabled range field 1306 stores the numbers of the tiers to which migration is possible. In FIG. 22, it can be seen that the file accessed by the client/host 300 has the file number 2 and the file name B.doc, and that the current tier is Tier 3, the inode is 2, and that the access count is 11. It is also clear that the tiering-enabled range of the file with file number 2 is Tiers 1 to 4 and that migration to any tier is possible. By preconfiguring the tiering-enabled range for each file, hierarchical control processing in file units can be implemented on the basis of the predetermined policy instead of hierarchical control processing according to the file access frequency.

Returning to FIG. 20, the file system 3 of the file storage apparatus 100 issues a read/write request to the disk array device 200 (S24). More specifically, the file system 3 refers to the Tier 3 inode management table 122B and designates a data block address which corresponds to the inode number targeted by the read/write request and issues a read/write request to the disk array device. In the case of FIG. 23, it can be seen that the data block address of the file with the inode number 3010 starts at 3000.

Going back to FIG. 20, the disk array device 200 searches for the page targeted by the read/write processing and executes read/write processing (S25). More specifically, the disk array device 200 refers to the Tier 3 virtual LU configuration table 271 and specifies the page number corresponding to the virtual LU address received from the client/host 300. FIG. 24 shows the Tier 3 virtual LU configuration table 271. In the case of FIG. 24, it can be seen that if the virtual LU address received from the client/host 300 is 3000, for example, the page number is 1 and the offset is 0.

Furthermore, the disk array device 200 refers to the Tier 3 page management table 270 and acquires the LDEV number and real address which correspond to the page number and executes read/write processing on the data stored in the storage area corresponding to the acquired address. FIG. 25 shows the Tier 3 page management table 270. In the case of FIG. 25, it can be seen, for example, that the LDEV number corresponding to the page number 1 is 3 and that the real address is 300000. Read/write processing is therefore executed for data which is stored in the storage area corresponding to the real address 300000.

Further, if data is added in the write processing, the disk array device 200 retrieves a page number for which the assignment state is unassigned from the page management table 270, acquires the LDEV number and real address which correspond to the page number, writes data to the storage area corresponding to this address, and updates the page management table 270 and virtual LU configuration table 271.

Returning to FIG. 20, the disk array device 200 issues notification of the read/write processing completion report and virtual LU address to the file system 3 (S26). If data is added, the file system 3 configures the value of the block address where the added data is stored in the inode management table 122B (S27). The file system 3 then reports that read/write processing for existing data is complete to the file system 1 (S28). In addition, the file system 1 reports that read/write processing of existing data is complete to the client/host 300 (S29).

(5-1-2-2) Read/Write Processing Before Tier Migration

Read/write processing before tier migration will be described next. Before tier migration means a state where hierarchical control processing has not yet been executed for files stored in Tier 1 and the files have not been migrated to a tier other than Tier 1.

The file storage apparatus 100 receives a read/write request for an existing file from the client/host 300 (S31). The file storage apparatus 100 which receives a read/write request for an existing file checks the inode number contained in the received read/write request from the inode management table 122A of Tier 1 (file system 1) (S32). Further, the file storage apparatus 100 checks the stubbing flag 1226, the migration-destination tier number 1227 and the migration-destination inode number 1228 in the Tier 1 inode management table 122A and determines whether the file is in Tier 1 or has been migrated to a tier other than Tier 1.

FIG. 26 shows an example of a Tier 1 inode management table 122A. In the case of FIG. 26, it can be seen that since a flag indicating that the file of inode number 3 has been stubbed has not been configured, the file is a file in Tier 1.

Further, the file system 1 of the file storage apparatus 100 issues a read/write processing request to the disk array device 200 (S33).

Figure 27:
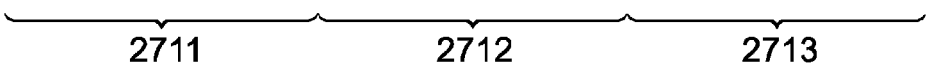
FIG. 27 is a table showing the content of a virtual LU configuration table according to this embodiment.

The disk array device 200 searches for the page targeted by the read/write processing and executes read/write processing (S34). More specifically, the disk array device 200 refers to the Tier 1 virtual LU configuration table 271 and specifies the page number corresponding to the virtual LU address which is received from the client/host 300. FIG. 27 shows the Tier 1 virtual LU configuration table 271. In the case of FIG. 27, it can be seen that if a virtual LU address received from the client/host 300 is 200, for example, the page number is 2 and the offset is 0.

Further, the disk array device 200 refers to the Tier 1 page management table 270, acquires the LDEV number and real address corresponding to the page number, and executes read/write processing on the data stored in the storage area corresponding to the acquired address (S35). FIG. 28 shows the Tier 1 page management table 270. In the case of FIG. 28, it can be seen, for example, that the LDEV number corresponding to page number 2 is 1 and the real address is 100100. Read/write processing is therefore executed on data stored in the storage area corresponding to the real address 100100.

Furthermore, if data is added in the write processing, the disk array device 200 retrieves a page number for which the assignment state is unassigned from the page management table 270, acquires the LDEV number and real address which correspond to the page number, writes data to the storage area corresponding to this address, and updates the page management table 270 and virtual LU configuration table 271.

Further, the disk array device 200 issues notification of the read/write processing completion report and LU address to the file system 1 (S36). If data is added, the file system 1 configures the value of the block address where the added data is stored in the inode management table 122A (S37). The file system 1 then reports that read/write processing for existing data is complete to the client/host 300 (S38).

(5-2) Hierarchical Control

Block level hierarchical control processing is executed by the disk array device 200 for the file stored in Tier 1. The data migration by the block level hierarchical control is hidden in the disk array device 200 and hence there is no change in the information of the logical volume (LU) from the perspective of the file storage apparatus 100. Hence, the file storage apparatus 100 does not identify whether the hierarchical control processing is executed and file system information (inode information) is not changed.

On the other hand, file level hierarchical control processing is executed by the file storage apparatus 100 for files stored in Tiers 2 to 4 outside Tier 1. Data migration under file level hierarchical control is executed between the tiers of the file storage apparatus 100 and hence data migration between logical volumes (LU) takes place and the file system information (inode information) is changed.

(5-2-1) Block Level Hierarchical Control

First, block level hierarchical control processing will be described. Block level hierarchical control processing is executed in Tier 1 by the page data mover program 212 of the disk array device 200. Tier 1 is logical volume (LU) which is configured from a mixture of SSD, SAS, and SATA.

As examples of block level hierarchical control processing, the flow of block (page) data migration processing with the following three patterns will be described next.

(Pattern 1) Migration of data stored in SSD page 1 to SAS page 4

(Pattern 2) Migration of data stored in SAS page 3 to SATA page 6

(Pattern 3) Migration of data stored in SATA page 5 to SAS page 2

The pattern 1 is a pattern in which the data of a storage tier configured from a higher performance SSD is migrated to a storage tier configured from an SAS with a lower performance than the SSD. Furthermore, the pattern 2 is a pattern in which the data of a storage tier configured from an SAS is migrated to a storage tier configured from a SATA with a lower performance than the SAS. Further, the pattern 3 is a pattern in which the data of a storage tier configured from a SATA is migrated to the storage tier configured from SAS which has a higher performance than the SATA.

Figure 29:
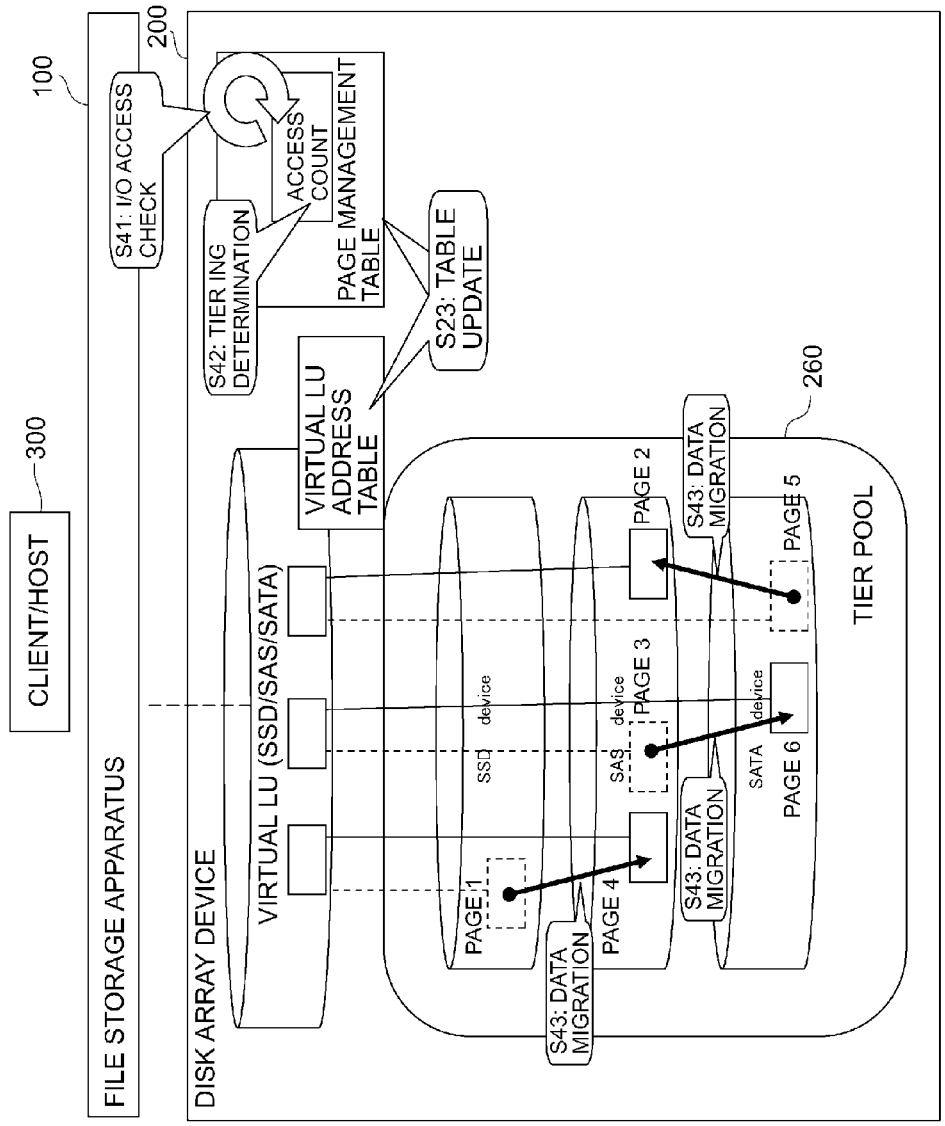
FIG. 29 is a conceptual diagram showing block level tier control processing according to this embodiment.

As shown in FIG. 29, the disk array device 200 first checks the number of accesses page by page and hence acquires the number of accesses of the access count 2706 of the page management table 270 (S41). FIG. 30 shows an example of the Tier 1 page management table 270. In the case of FIG. 30, it can be seen that, for page numbers 1, 3, and 5, the assignment state is 1 (assigned), the access count is five for page number 1, one for page number 3, and six for page number 5.

Returning to FIG. 29, if the specific time interval or the unused capacity of the storage area exceeds a predetermined threshold, it is determined whether data migration is necessary (tiering determination) (S42). The specific method of the tiering determination is as follows. FIG. 31 shows an example of the Tier 1 virtual LU configuration table 271. The Tier 1 virtual LU address table 271 shown in FIG. 31 is a virtual LU configuration table 271 before the tiering determination, and it can be seen, for example, that the page number corresponding to the Tier 1 virtual LU address 0 is 1, the offset is 0, and that the page number corresponding to the Tier 1 virtual LU address 1 is 1 and the offset is 50.

Figure 32:
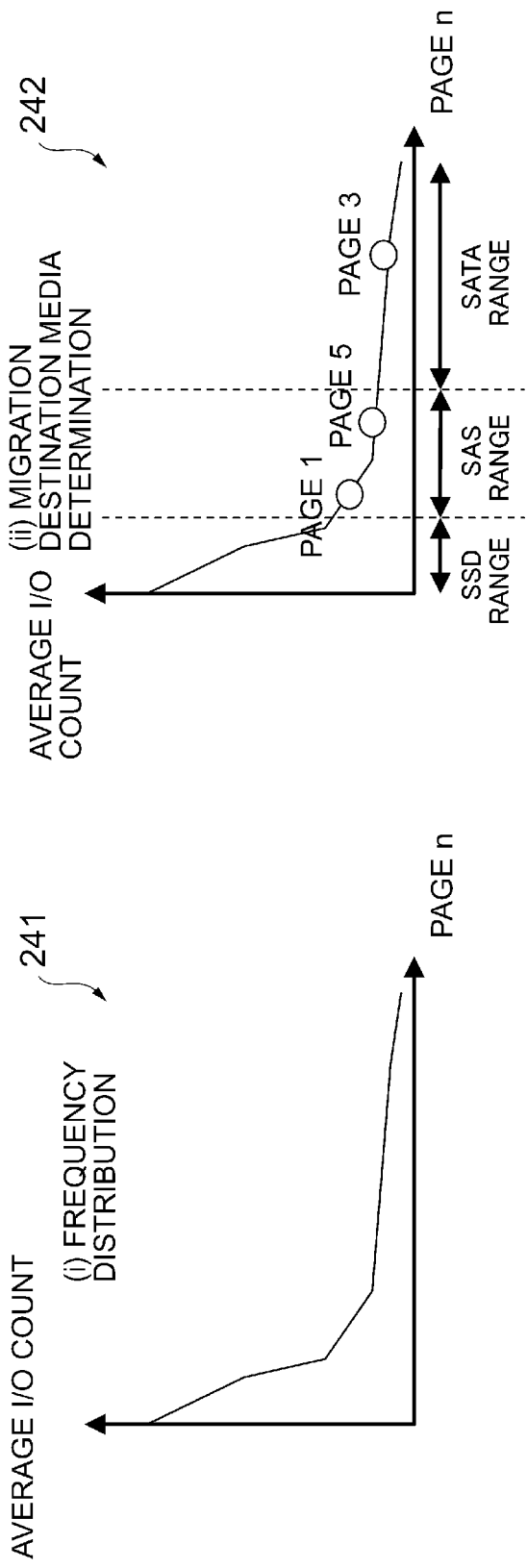
FIG. 32 is a graph showing an I/O frequency distribution according to this embodiment.

The disk array device 200 calculates the average I/O count for each page and creates an I/O frequency distribution for each page based on the calculated I/O access frequency (S42-1). The graph 241 in FIG. 32 shows an example of the I/O frequency distribution of each page. As shown in graph 241, in the I/O frequency distribution, the page numbers are plotted on the horizontal axis and the I/O count of each page is plotted on the vertical axis.

The storage medium which is a page migration destination is then determined according to the capacity of the migration destination storage medium and the page number and migration content are configured in association with one another in the page migration management table 243 (S42-2). The graph 242 in FIG. 32 shows the migration-destination media determination result using the I/O frequency distribution. As shown in the graph 242, the range to which each storage medium is adapted is defined in the graph 242 according to the capacity of each storage medium. Further, based on graph 242, it is determined whether the pages where the data is stored lie within a suitable storage medium range.

For example, it can be seen from graph 242 that the I/O frequency of page number 1 is the SAS-range I/O frequency. It is therefore clear that the data of page number 1 should be migrated from the current SSD to the SAS. Furthermore, it can be seen from graph 242 that the I/O frequency of the page number 3 is an SATA range I/O frequency. It is therefore clear that the data of page number 3 should be migrated from the current SAS to SATA. It can also be seen from graph 242 that the I/O frequency of page number 5 is the SAS range I/O frequency. It can be seen that the data of page number 5 should be migrated from the current SATA to SAS.

Figure 33:
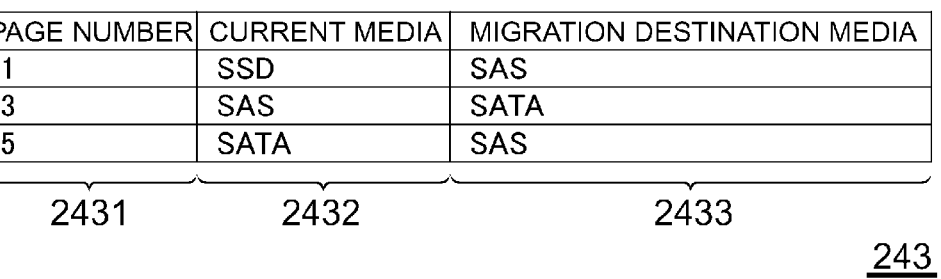
FIG. 33 is a table showing the content of a page migration management table according to this embodiment.

Therefore, the disk array device 200 manages the page numbers and migration content of the migration target pages in association with one another in the page migration management table 243. As shown in FIG. 33, the page migration management table 243 is configured from a page number field 2431, a current media field 2432, and a migration destination media field 2433. The page number field 2431 stores a migration target page number. The current media field 2432 stores the type of storage medium where the migration target page is currently stored. The migration destination media field 2433 stores the type of migration destination storage medium of the page being migrated.

Returning to FIG. 29, the disk array device 200 refers to the page migration management table 243 shown in FIG. 33, actually migrates the data, and updates each table managing the page (SS43). More specifically, a case where the data stored in the SSD page number 1 is migrated to an SAS is described by way of example.

First, the disk array device 200 reserves the page of a storage medium which is a data migration destination (S43-1). Here, the disk array device 200 reserves the page of an SAS which is a migration destination storage medium. FIG. 34 shows an example of the Tier 1 page management table 270. In the case of FIG. 34, it can be seen that the page is reserved by changing the assignment state of the page number 4 for which the media type (storage medium type) is SAS from 0 (unassigned) to 1 (assigned).

Further, the disk array device 200 copies the migration target data and stores the data in the storage area corresponding to the reserved page number (S43-2). After data copying is complete, the disk array device 200 changes the page number of the virtual LU configuration table 271 (S43-3). More specifically, the disk array device 200 performs processing to copy the data of page number 1 to page number 4 in steps S43-2 and S43-3, and therefore changes the page number from 1 to 4 for the migration target entry in the virtual LU configuration table 271. FIG. 35 shows an example of the Tier 1 virtual LU configuration table 271. In the case of FIG. 35, it can be seen that the virtual LU address 0 is associated with page number 1 and offset 0 and the virtual LU address 50 is associated with page number 1 and offset 50. Since the data stored in SSD page number 1 is copied to the SAS page number 4 by the data migration processing, the page number is changed from 1 to 4.

The disk array device 200 subsequently releases the migration source page where the migration target data is stored (S43-4). More specifically, the disk array device 200 changes the assignment state of the migration source page of the Tier 1 page management table 270 from 1 (assigned) to 0 (unassigned) and configures the access count as 0. FIG. 36 shows an example of the Tier 1 page management table 270. In the case of FIG. 36, it can be seen that when the migration source page is released in step S43-4, the assignment state of page number 1 is changed from 1 (assigned) to 0 (unassigned) and the access count is initialized at 0.

(5-2-2) File Level Hierarchical Control

Figure 37:
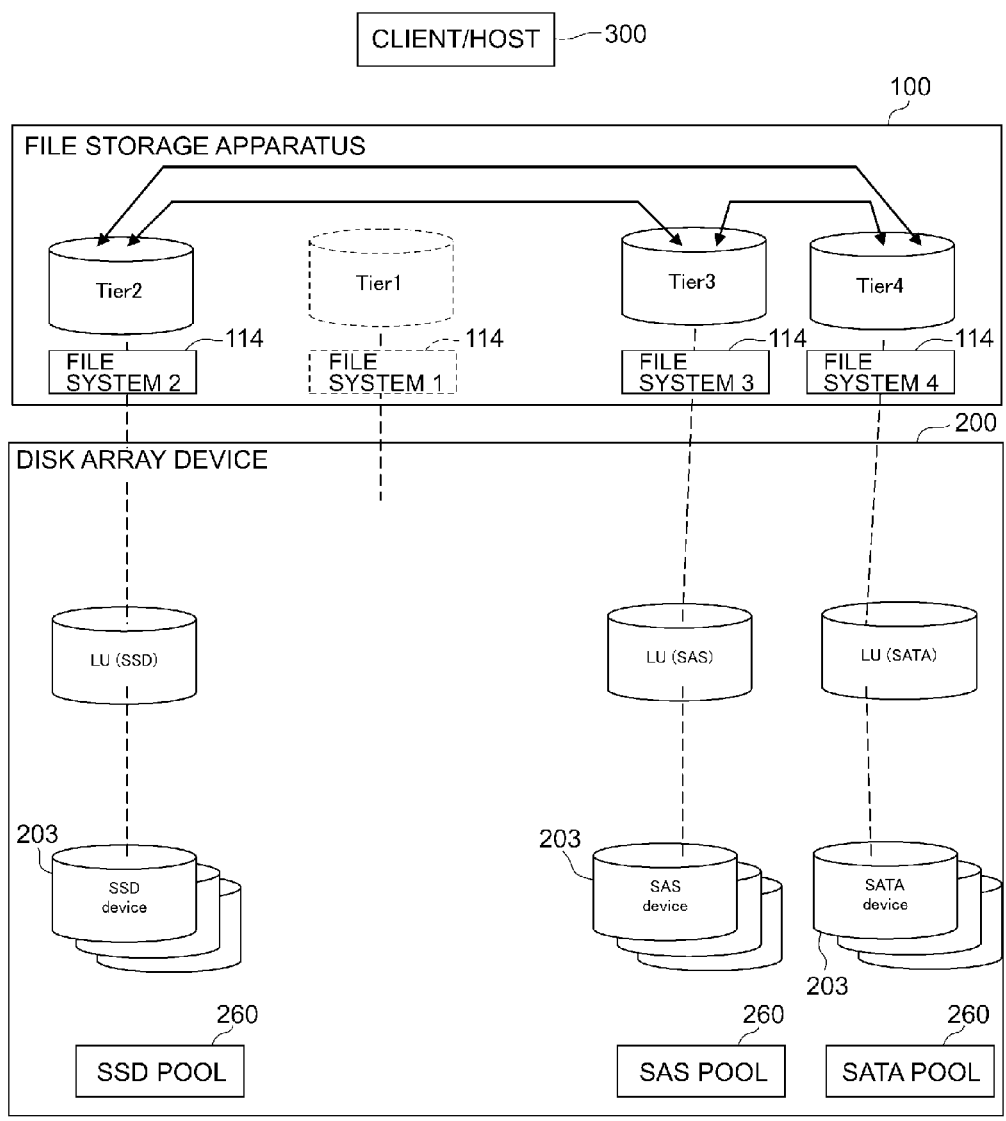
FIG. 37 is a conceptual diagram showing file level tier control processing according to this embodiment.

File level hierarchical control processing will be described next. The file level hierarchical control processing is executed in tiers (Tier 2 to Tier 4) other than Tier 1 by the file data mover program 113 of the file storage apparatus 100. As shown in FIG. 37, Tier 2 is logical volumes (LU) configured from SSD, Tier 3 is logical volumes (LU) configured from SAS, and Tier 4 is logical volumes (LU) configured from SATA. The file I/O monitoring program 112 of the file storage apparatus 100 monitors the frequency of access to the files of Tier 2, Tier 3, and Tier 4, and the file data mover program 113 migrates files by determining the file migration destination according to the monitoring result.

As examples of file level hierarchical control processing, the flow of file migration processing with the following three patterns will be described next.

(Pattern 4) Migration of file 1 stored in Tier 2 (SSD) to Tier 3 (SAS)

(Pattern 5) Migration of file 2 stored in Tier 3 (SAS) to Tier 4 (SATA)

(Pattern 6) Migration of file 3 stored in Tier 4 (SATA) to Tier 3 (SAS)

The pattern 4 is a pattern in which the file of Tier 2 configured from a higher performance SSD is migrated to Tier 3 configured from an SAS with a lower performance than the SSD. Furthermore, the pattern 5 is a pattern in which the file of Tier 3 configured from an SAS is migrated to a storage tier configured from a SATA with a lower performance than the SAS. Further, the pattern 6 is a pattern in which the file of Tier 4 configured from a SATA is migrated to Tier 3 configured from SAS which has a higher performance than the SATA.

In order to check the number of accesses to each file, the file storage apparatus 100 first acquires the access counts in the access count 1305 of the file management table 130 (S51). FIG. 38 shows an example of the file management table 130. In the case of FIG. 38, it can be seen that the access count corresponding to each file is stored in the access count 1305 field.

If the specific time interval or the unused capacity of the storage area exceeds a predetermined threshold, it is determined whether data migration is necessary (tiering determination) (S52). The specific method for the tiering determination is as follows.

Figure 39:
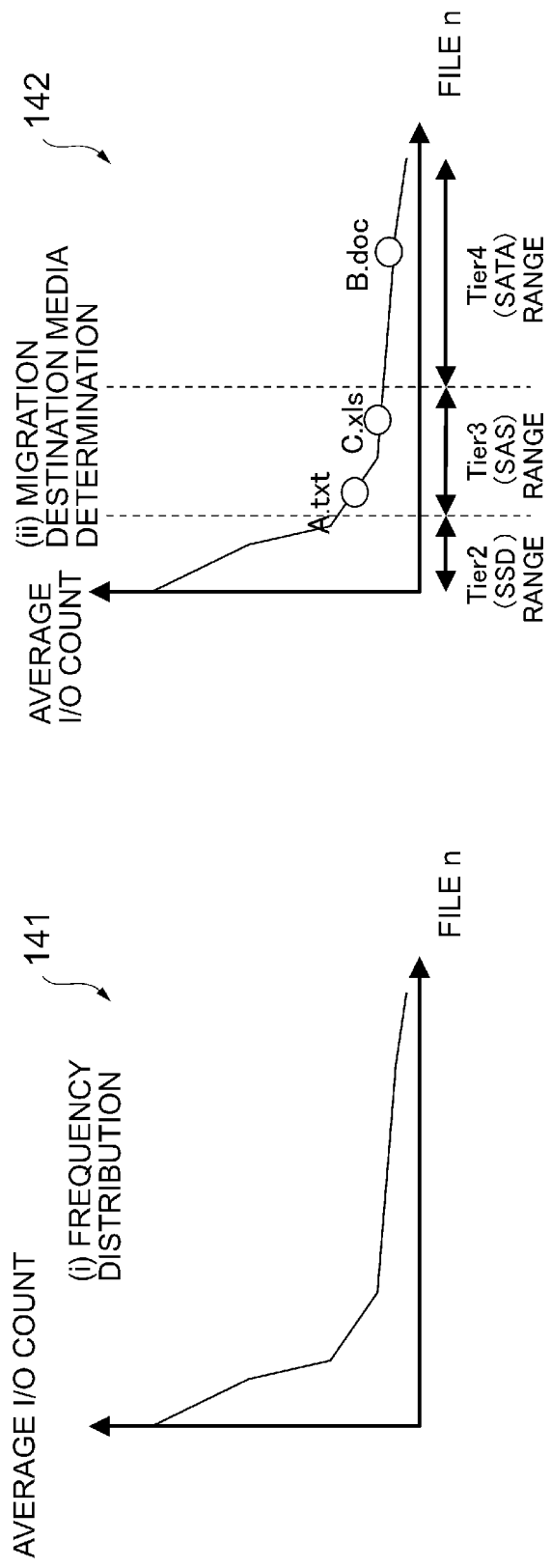
FIG. 39 is a graph showing an I/O frequency distribution according to this embodiment.

The file storage apparatus 100 calculates the average I/O count for each file and creates an I/O frequency distribution for each file based on the calculated I/O access frequency (S52-1). At this time, the file storage apparatus 100 refers to the current tier field 1303 and tiering-enabled range field 1306 in the file management table 130 and excludes tiering-disabled files. For example, in FIG. 38, E.doc is a file which is fixed in Tier 4 and F.db is a file which is fixed in Tier 1, and these files are therefore excluded from the tiering target files. The graph 141 in FIG. 39 shows an example of the I/O frequency distribution for each file. As shown in graph 141, in the I/O frequency distribution, the file numbers are plotted on the horizontal axis and the I/Os for each file are plotted on the vertical axis.

The storage medium which serves as the file migration destination is subsequently determined according to the capacity of the migration destination storage medium and the file number and migration content are configured in association with one another in the file migration management table 143 (S52-2). The graph 142 in FIG. 39 shows the migration destination media determination result which uses the I/O frequency distribution. As shown in graph 142, the range to which each storage medium is suited is defined in graph 142 according to the capacity of each storage medium. Furthermore, a determination is made, based on graph 142, of whether each file is within a suitable storage medium range.

It can be seen from graph 142, for example, that the I/O frequency for file number A.txt is an I/O frequency in the Tier 3 (SAS) range. It is therefore clear that the file with the file number A.txt should be migrated from the current Tier 2 (SSD) to Tier 3 (SAS). It is also clear from graph 142 that the I/O frequency of the file with the file number B.doc is an I/O frequency in the Tier 4 (SATA) range. It can be seen that the file with the file number B.doc is therefore a file which is to be migrated from the current Tier 3 (SAS) to Tier 4 (SATA). It can also be seen from graph 142 that the I/O frequency of file number C.xls is an I/O frequency in the Tier 4 (SATA) range. It can therefore be seen that the file with the file number C.xls is a file which is migrated from the current Tier 4 (SATA) to Tier 3 (SAS).

Therefore, the file storage apparatus 100 manages the file numbers of the migration target files and the migration content in association with one another in the file migration management table 143. As shown in FIG. 40, the file migration management table 143 is configured from a file number field 1431, a current tier field 1432 and a migration destination tier field 1433. The file number field 1431 stores the numbers of the migration target files. The current tier field 1432 stores the current tier numbers of the migration target files. The migration destination tier field 1433 stores the migration destination tier numbers of the migration target pages.

Furthermore, the file storage apparatus 100 actually migrates the files (S53). More specifically, the file storage apparatus 100 reserves the file migration destination inodes (S53-1). The file storage apparatus 100 reserves the migration destination pages in co-operation with the disk array device 200, and configures the virtual LU addresses corresponding to the reserved pages in the file inode. For example, a case where a file 1 stored in the current Tier 2 (SSD) is migrated to Tier 3 (SAS) will be described by way of example.

Figure 42:
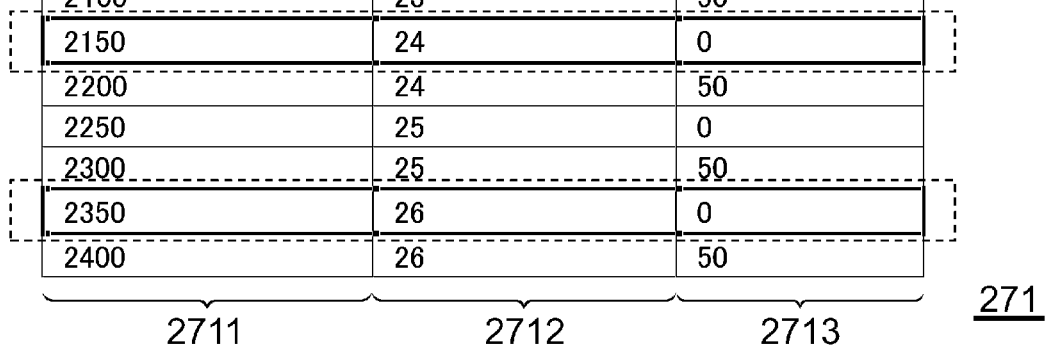
FIG. 42 is a table showing the content of a virtual LU configuration table according to this embodiment.
Figure 43:
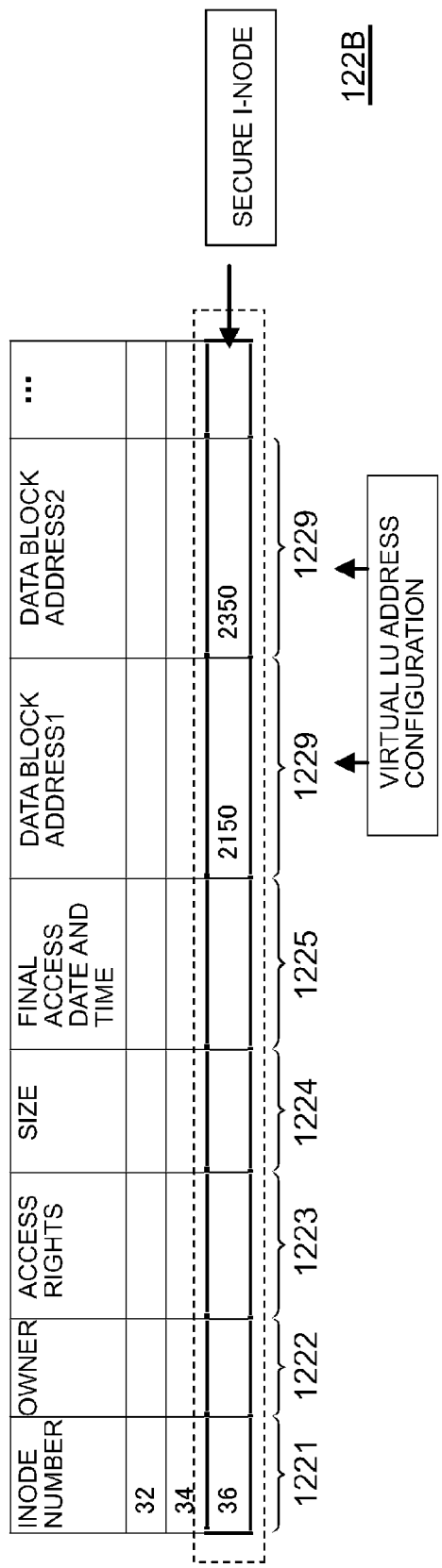
FIG. 43 is a table showing the content of an inode management table according to this embodiment.

First, the disk array device 200 reserves a Tier 3 page which is to serve as the file migration target. FIG. 41 shows an example of the Tier 3 page management table 270. In the case of FIG. 41, it can be seen that the page is reserved by changing the assignment states of page numbers 24 and 26 from 0 (unassigned) to 1 (assigned). Further, the disk array device 200 acquires the virtual LU addresses (2150, 2350) which correspond to page numbers 24 and 26 of the virtual LU configuration table 271 shown in FIG. 42. The disk array device 200 issues a notification of the acquired virtual LU addresses to the file storage apparatus 100. Furthermore, as shown in FIG. 43, the file storage apparatus 100 which receives the virtual LU addresses from the disk array device 200 reserves an inode number which is the file migration destination and associates the inode number with the notified virtual LU addresses.

Thereafter, the migration target file data is copied to the migration destination page in the disk array device 200 (S53-2).

The disk array device 200 and file storage apparatus 100 then release the migration source page and inode and change the Tier 1 inode information (S53-3). For example, as shown in FIG. 44, the disk array device 200 changes the assignment states of the premigration pages (page numbers 14 and 16) in the page management table 270 from 1 (assigned) to 0 (unassigned). Further, as shown in FIG. 45, the disk array device 200 deletes the page numbers associated with the pre-migration virtual LU addresses (1150, 1350) in the virtual LU configuration table 271. As shown in FIG. 46, the file storage apparatus 100 then releases the virtual LU addresses configured as the data block addresses which are associated with the pre-migration inode number.

The file storage apparatus 100 then changes the Tier 1 inode information. As mentioned earlier, the Tier 1 inode information stores a migration destination tier number, a migration destination inode number, and a data block address (virtual LU address) in cases where files are stored in tiers other than Tier 1. In cases where the file storage destination is migrated from Tier 2 to Tier 3, as shown in FIG. 47, the file storage apparatus 100 changes the migration destination tier number in the Tier 1 inode management table 122A from 2 to 3, changes the migration destination inode number from 25 to 36, and changes the data block addresses from 1150 to 2150 and from 1350 to 2350.

In so doing, page unit migration processing is executed according to the block (page unit) access frequency for the files stored in Tier 1 and file-unit migration processing is executed according to the file unit access frequency for the files stored in tiers (Tier 2 to Tier 4) other than Tier 1.

(5-3) Hierarchical Control Switching

The data I/O processing is first managed by a Tier 1 file system. Although block level hierarchical control is executed in Tier 1, the hierarchical control is changed from block level hierarchical control to file level hierarchical control based on predetermined conditions. In other words, when data is migrated from Tier 1 to any of Tiers 2, 3 and 4, file level hierarchical control processing is executed after migration. Further, although file level hierarchical control is executed for the files migrated to any of Tiers 2, 3 and 4, the hierarchical control is changed from file level hierarchical control to block level hierarchical control based on predetermined conditions. That is, when data is migrated to Tier 1 from any of Tiers 2, 3 and 4, block level hierarchical control processing is executed after migration.

(5-3-1) Switching from Block Level Hierarchical Control to File Level Hierarchical Control Processing to switch from block level hierarchical control to file level hierarchical control will be described first. The file storage apparatus 100 inspects the usage of file blocks (file blocks to which the inode points) at regular intervals (S61). More specifically, the file storage apparatus 100 uses the block addresses to issue an inquiry to the disk array device 200 to acquire the type of storage medium in which the file blocks are stored (SSD, SAS, and SATA and the like). Similarly to the foregoing data read/write processing, the information on the storage medium type makes it possible to acquire the type of storage medium, that is, which tier a file block is stored in from the association between the virtual LU address in the virtual LU configuration table 271 and the page management table 270.

Figure 48:
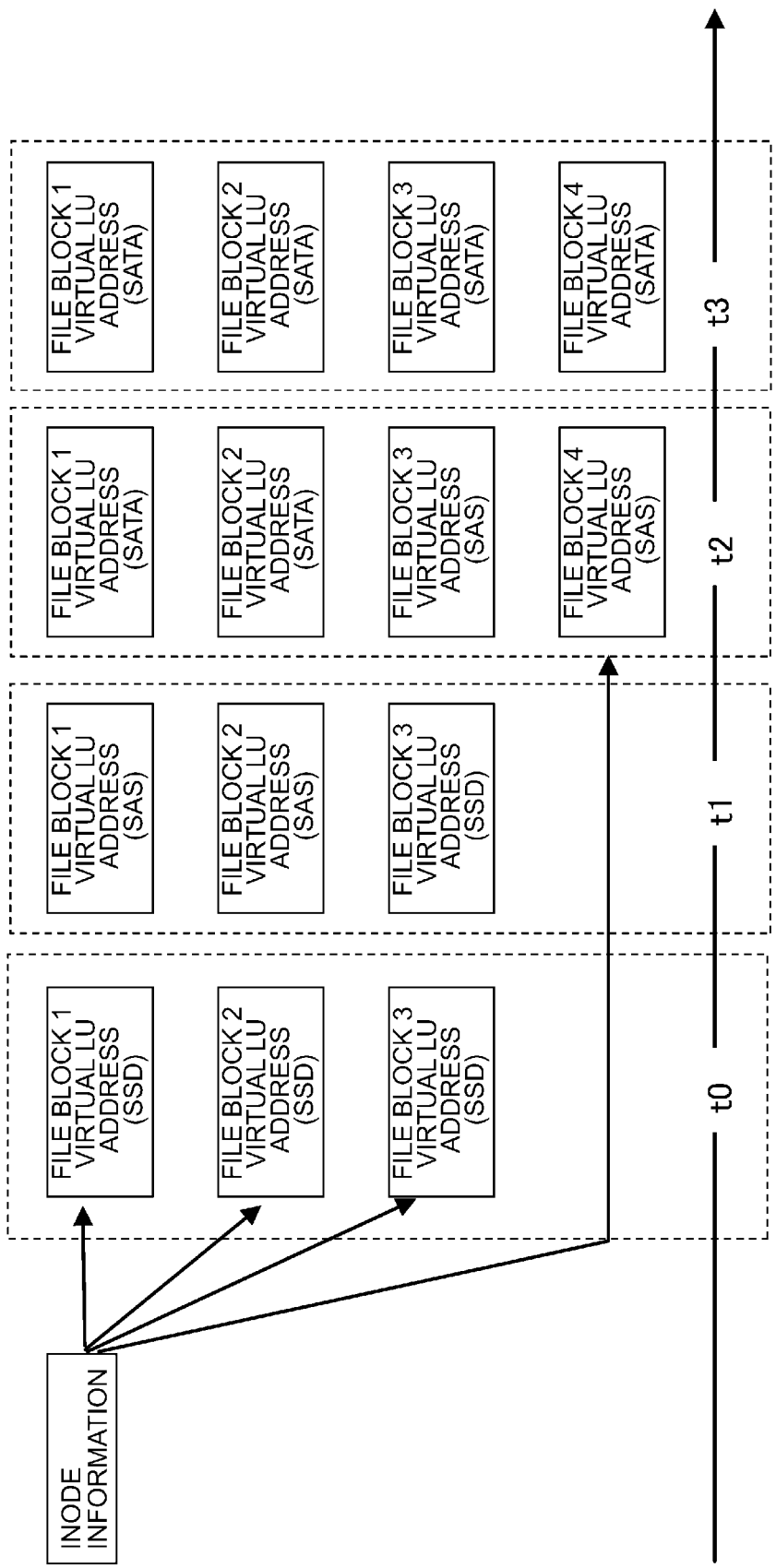
FIG. 48 is a conceptual diagram showing time-series variations in the inode information according to this embodiment.

FIG. 48 shows a case where the type of storage medium where the file block contained in a certain file is stored is chronologically changed. In FIG. 48, it can be seen that a plurality of file blocks are pointed using the inode information of a certain file and that the storage medium in which the file block is stored is changed in chronological order through t0, t1, t2, and t3. The file block configuration of each file is managed by the file block configuration list 150.

FIG. 49 shows an example of the file block configuration list 150. The file block configuration list 150 is created for each predetermined time interval. Further, the file path name is associated with the file block contained in the file. In the case of FIG. 49, it can be seen that, at time t0, the file block specified by the file path name/home/share/a.txt is stored in an SAS (Tier 3) and that the file block specified by the file path name/home/share/b.txt is stored in a SATA (Tier 4).

It is subsequently determined whether switching from block level hierarchical control to file level hierarchical control is required at specified time intervals or if the unused capacity of the storage area exceeds a predetermined threshold (S62). More specifically, the file storage apparatus 100 extracts files requiring hierarchical control switching processing based on the following policies (S62-1)

(Policy 1) In the file block configuration list 150, data is biased toward a specific storage medium and there is barely any change over time. Further, migration to a tier other than Tier 1 is possible within the tiering-enabled range of the file management table 130.

(Policy 2) Files for which Tier 1 is not contained in tiering-enabled range of the file management table 130.

The files corresponding to policy 1 are files for which storage in a specific storage medium other than Tier 1 is desirable. Further, files corresponding to policy 2 are files for which block level hierarchical control is not allowed and which must be immediately migrated to tiers other than Tier 1.

Figure 50:
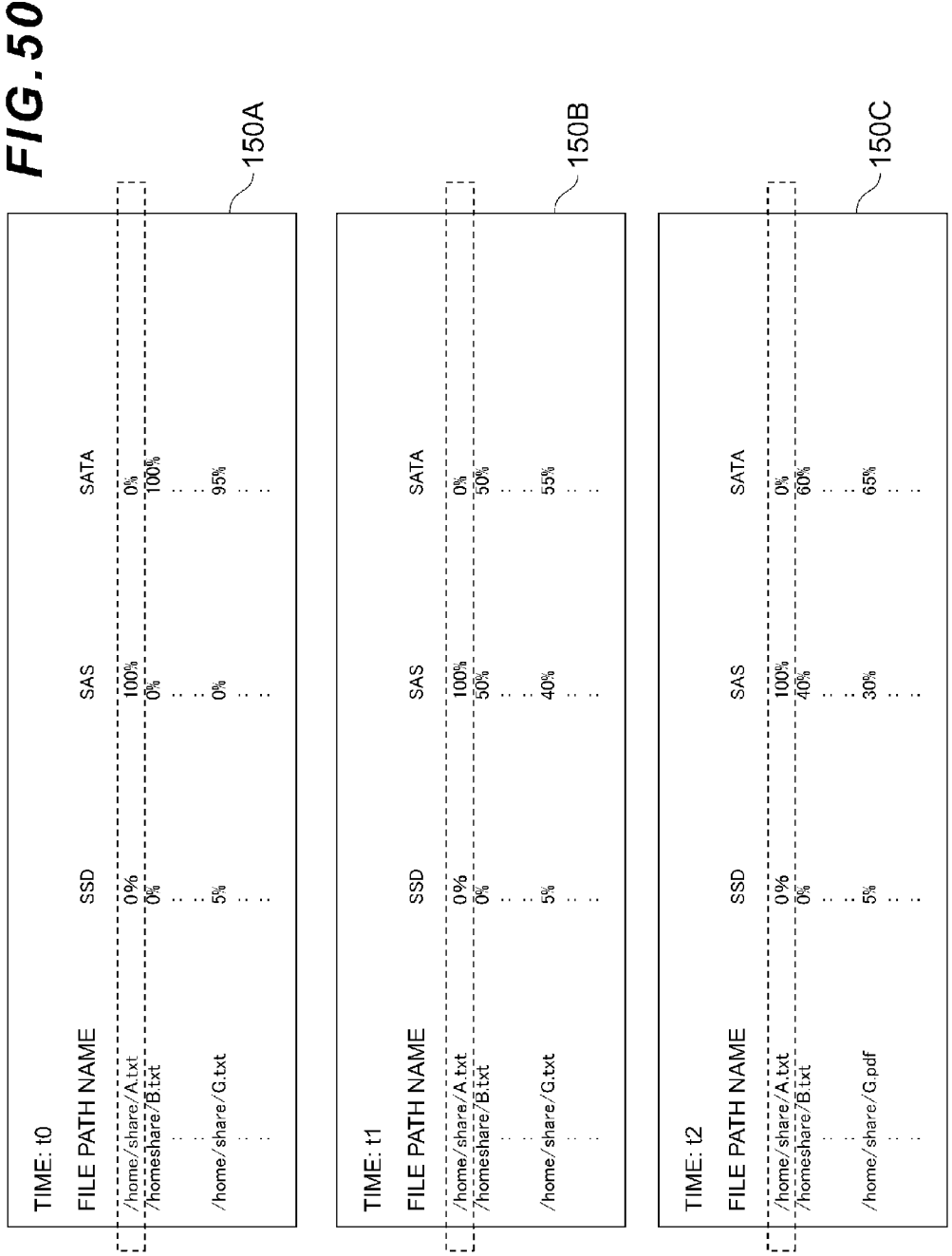
FIG. 50 is a table showing the content of a file block configuration list according to this embodiment.

For example, in the file block configuration list 150 in FIG. 50, the file path name/home/share/A.txt is stored 100% in a SAS at times t0 to t2 and therefore corresponds to policy 1. Further, as shown in FIG. 51, the file path name/home/share/G.txt corresponds to policy 2 since Tier 1 is not contained in tiering-enabled range field 1306 of the file management table 130. Further, it can be seen from FIG. 51 that Tier 1 is not contained in the tiering-enabled range, and therefore the file path name/home/share/D.txt and the file path name/home/share/E.txt are also files which must immediately be migrated to tiers other than Tier 1.

Thus, in file level hierarchical control processing, the policy can be pre-configured in file units and it is possible to determine in which tier to store any file irrespective of the access frequency. Accordingly, a file in which there is some data with a high access frequency but which overall need not be stored in a high performance storage medium can be stored in a low performance storage medium, thereby enabling efficient data management.

For files in which data is biased toward a specific storage medium in the file block configuration list 150, the file storage apparatus 100 determines the tier corresponding to the storage medium as the migration destination tier (S62-2). In so doing, the file storage apparatus 100 checks the tiering-enabled range field 1306 of the file management table 130. Further, if the tier determined to be the migration destination tier does not match the tier in the tiering-enabled range field 1306, the file storage apparatus 100 selects the tier with the performance lower than the tier determined as the migration destination tier.

The file migration destination tier is then determined and the file number and migration content are configured in association with one another in the file migration management table 143 (S62-3). In the case of the file migration management table 143 shown in FIG. 52, it can be seen that the file with the file number 1 is migrated from Tier 1 to Tier 3. File number 1 has data biased toward Tier 3 (SAS) and the tier-enabled range of file number 1 is Tiers 1 to 4, and a switch is therefore made to file level hierarchical control and the file data is migrated to Tier 3 (SAS). Furthermore, it can be seen from the migration management table 143 that the file with file number 7 is migrated from Tier 1 to Tier 4. File number 7 has data biased toward Tier 4 (SATA) and the tier-enabled range is Tiers 2 to 4, and a switch is therefore made to file level hierarchical control and the file data is migrated to Tier 4 (SATA).

Further, the file storage apparatus 100 actually migrates files (S63). Hereinafter, a case will be described for file 1 in which the data stored in current Tier 1 is migrated to Tier 3 (SAS). More specifically, the file storage apparatus 100 reserves the migration destination inode of the file (S63-1).

The disk array device 200 then reserves the Tier 3 page which is to serve as the file migration destination. FIG. 53 shows an example of the Tier 3 page management table 270. In the case of FIG. 53, it can be seen that the page is reserved by changing the assignment states of page numbers 24 and 26 from 0 (unassigned) to 1 (assigned). The disk array device 200 then acquires the virtual LU addresses (2150, 2350) which correspond to the page numbers 24 and 26 in the virtual LU configuration table 271 shown in FIG. 54. The disk array device 200 notifies the file storage apparatus 100 of the acquired virtual LU addresses. As shown in FIG. 55, the file storage apparatus 100 which receives notification of the virtual LU addresses from the disk array device 200 reserves the inode number which is to serve as the file migration destination and associates the inode number with the notified virtual LU addresses.

Thereafter, the migration target file data is copied to the migration destination page in the disk array device 200 (S63-2).

The disk array device 200 and file storage apparatus 100 then release the migration source page and inode and change the Tier 1 inode information (S63-3). For example, as shown in FIG. 56, the disk array device 200 changes the assignment state of the premigration page (page number 1) in the page management table 270 from 1 (assigned) to 0 (unassigned). Further, as shown in FIG. 57, the disk array device 200 deletes the page number associated with the pre-migration virtual LU addresses (0, 50) in the virtual LU configuration table 271. As shown in FIG. 58, the file storage apparatus 100 then configures the stubbing flag, which indicates that the file has been migrated to a tier other than Tier 1 and configures the data block address where the migration destination tier number (2), migration destination inode number (36), and file data are stored.

Figure 59:
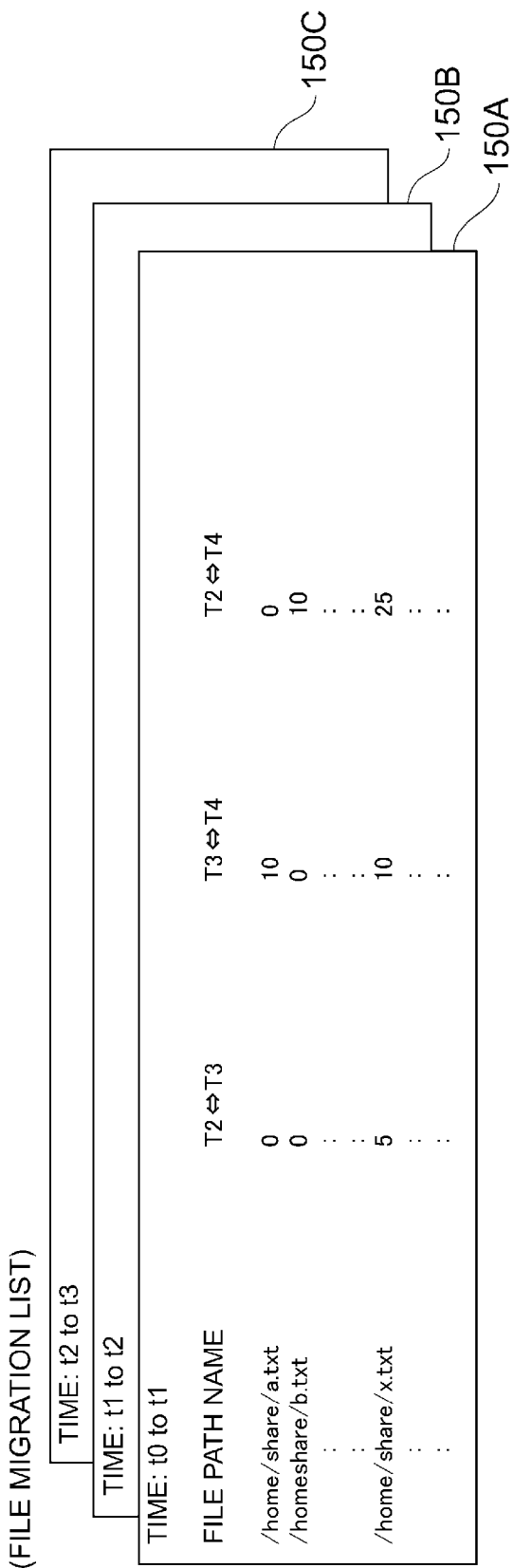
FIG. 59 is a table showing the content of a file migration list according to this embodiment.

(5-3-2) Switching from File Level Hierarchical Control to Block Level Hierarchical Control Processing to switch from file level hierarchical control to block level hierarchical control will be described next. If the migration frequency of a file of a fixed size or greater exceeds a fixed value in the file level hierarchical control which is executed in Tiers 2 to 4, the file storage apparatus 100 specifies the file and migrates the file to Tier 1. The migration of files of Tiers 2 to 4 to Tier 1 signifies switching from file level hierarchical control to block level hierarchical control. The file storage apparatus 100 updates the file migration list 160 each time file migration takes place in Tier 2 to Tier 4 (S71). As shown in FIG. 59, the number of migrations between files for each file is recorded in the file migration list 160 at predetermined time intervals. The file storage apparatus 100 is able to manage the migration frequency for each file by means of the file migration list 160.

At specific time intervals or if the unused capacity of the storage area exceeds a predetermined threshold, the file storage apparatus 100 then determines whether switching from file level hierarchical control to block level hierarchical control is required (S72). More specifically, the file storage apparatus 100 extracts files for which hierarchical control switching processing is required based on the following policies (S72-1).

(Policy 3) Migration between tiers frequently occurs in the file migration list 160. Migration to Tier 1 in the tier-enabled range of the file management table 130 is possible.

Figure 60:
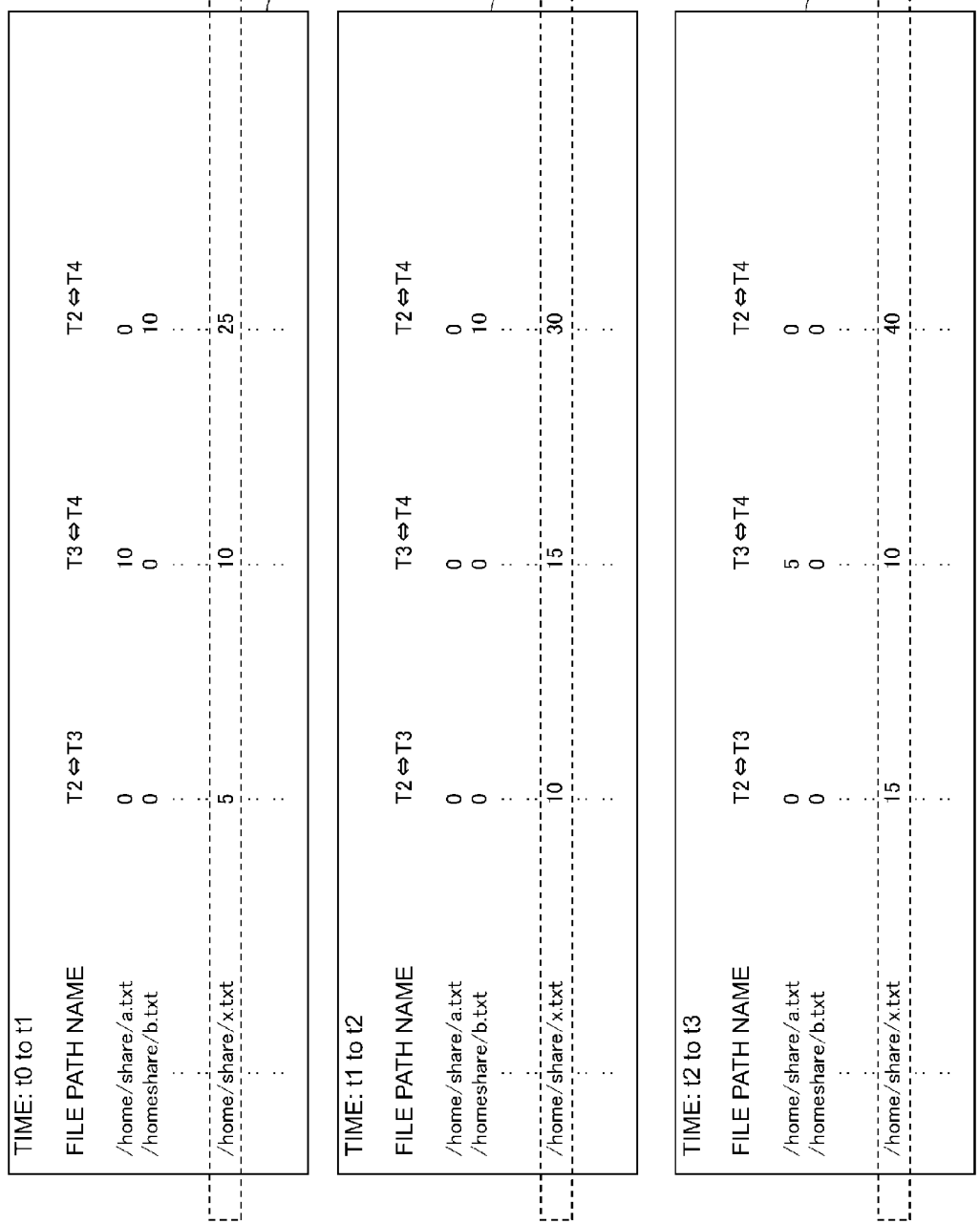
FIG. 60 is a table showing the content of a file migration list according to this embodiment.

For example, in the file migration list 160 of FIG. 60, migration between Tiers 2 and 4 frequently occurs for the file path name/home/share/x.txt. Furthermore, the file path name/home/share/x.txt corresponds to the above policy 3 because this is a file for which migration to Tier 1 is enabled in tiering-enabled range field 1306 in the file management table 130 shown in FIG. 61.

The file storage apparatus 100 determines the migration destination to be Tier 1 for the file with the file path name/home/share/x.txt for which migration between Tiers 2 to 4 has frequently occurred and the file number and migration content are configured in association with one another in the file migration management table 143 (S72-2). In the case of the file migration management table 143 shown in FIG. 62, it can be seen that the file with file number 8 is migrated from Tier 2 to Tier 1. The file with file number 8 undergoes frequent file migration between Tiers 2 to 4 and since the tier-enabled range is Tiers 1 to 4, switching takes place to block level hierarchical control and the file data is migrated to Tier 1.

Further, the file storage apparatus 100 actually migrates files (S73). Hereinafter, a case will be described for the file with the file number 8 in which the data stored in the current Tier 2 (SSD) is migrated to Tier 1. More specifically, the file storage apparatus 100 reserves the migration destination inode of the file (S73-1).

Figure 64:
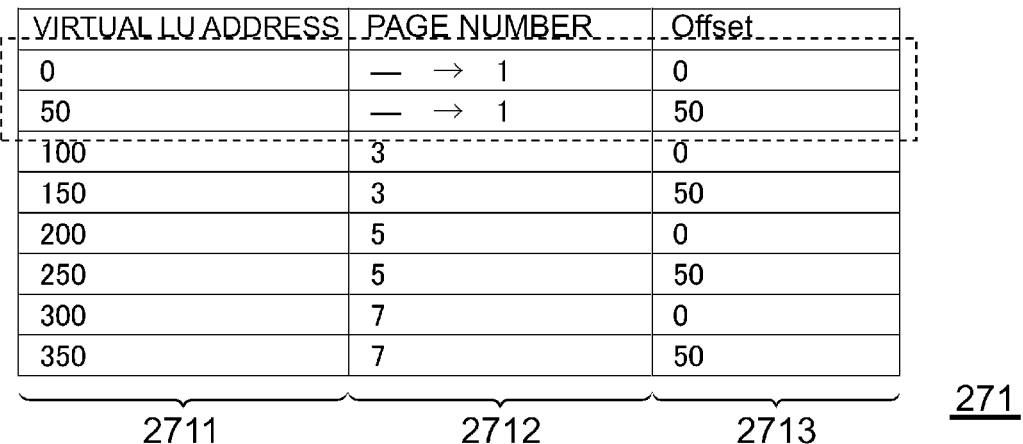
FIG. 64 is a table showing the content of a virtual LU configuration table according to this embodiment.

The disk array device 200 then reserves the Tier 1 page which is to serve as the file migration destination. FIG. 63 shows an example of the Tier 1 page management table 270. In the case of FIG. 63, it can be seen that the page is reserved by changing the assignment states of page numbers 24 and 26 from 0 (unassigned) to 1 (assigned). The disk array device 200 then acquires the virtual LU addresses (0, 50) which correspond to page number 1 and offset 0 and page number 1 and offset 50 in the virtual LU configuration table 271 shown in FIG. 64. The disk array device 200 notifies the file storage apparatus 100 of the acquired virtual LU addresses. As shown in FIG. 65, the file storage apparatus 100 which receives notification of the virtual LU addresses from the disk array device 200 reserves the inode number which is to serve as the file migration destination and associates the inode number with the notified virtual LU addresses.

Thereafter, the migration target file data is copied to the migration destination page in the disk array device 200 (S73-2).

Figure 68:
FIG. 68 is a table showing the content of an inode management table according to this embodiment.

The disk array device 200 and file storage apparatus 100 then release the migration source page and inode and change the Tier 2 inode information (S73-3). For example, as shown in FIG. 66, the disk array device 200 changes the assignment state of the premigration page (page number 1) in the page management table 270 from 1 (assigned) to 0 (unassigned). Further, as shown in FIG. 67, the disk array device 200 deletes the page number associated with the pre-migration virtual LU addresses (1150, 1350) in the virtual LU configuration table 271. As shown in FIG. 68, the file storage apparatus 100 then deletes the virtual LU address configured as the data block address with the targeted inode number in the Tier 2 inode table 122B, thereby releasing the inode.

(6) Processing Routine of Each Process

Each of the foregoing processes will be described next using the process flow.

(6-1) I/O Processing (6-1-1) New File Write Processing

Figure 69:
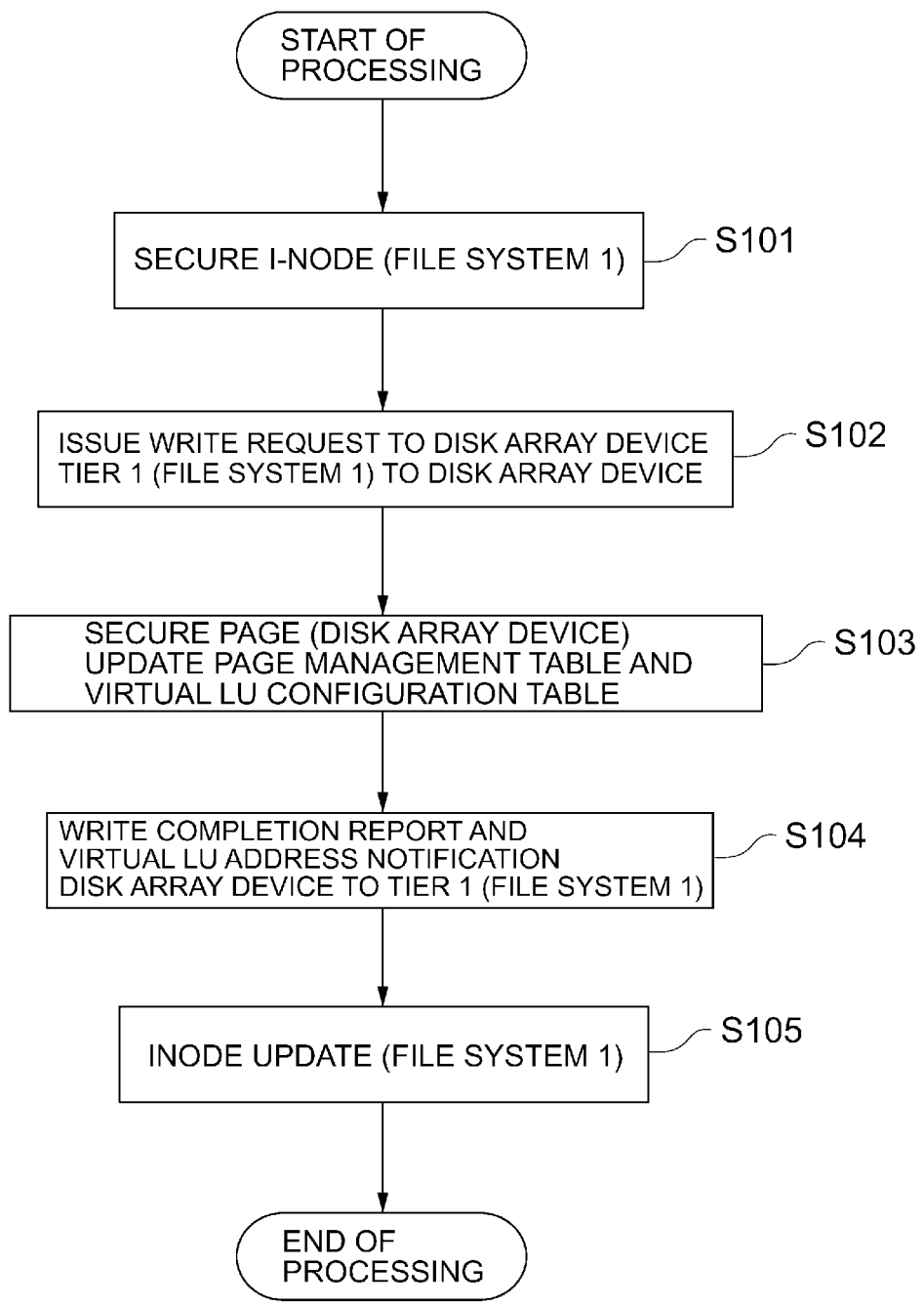
FIG. 69 is a flowchart showing the flow of new file write processing according to this embodiment.

As shown in FIG. 69, upon receiving a write request for a new file from the client/host 300, the file system 1 which manages Tier 1 of the file storage apparatus 100 reserves the inode of the file system 1 (S101). Furthermore, the file system 1 issues a write request to the disk array device 200 (S102).

The page data mover program 212 of the disk array device 200 which receives a write request from the file storage apparatus 100 in step S102 updates the page management table 270 and the virtual LU configuration table 271 (S103). The disk array device 200 then notifies the file system 1 of the new file write processing completion report and virtual LU addresses (S104). More specifically, the file system 1 configures the notified virtual LU addresses in the data block address field 1229 of the inode management table 122A.

The file system 1 of the file storage apparatus 100 updates the inode management table 122A and reports completion of new data write processing to the client/host 300 (S105).

Figure 70:
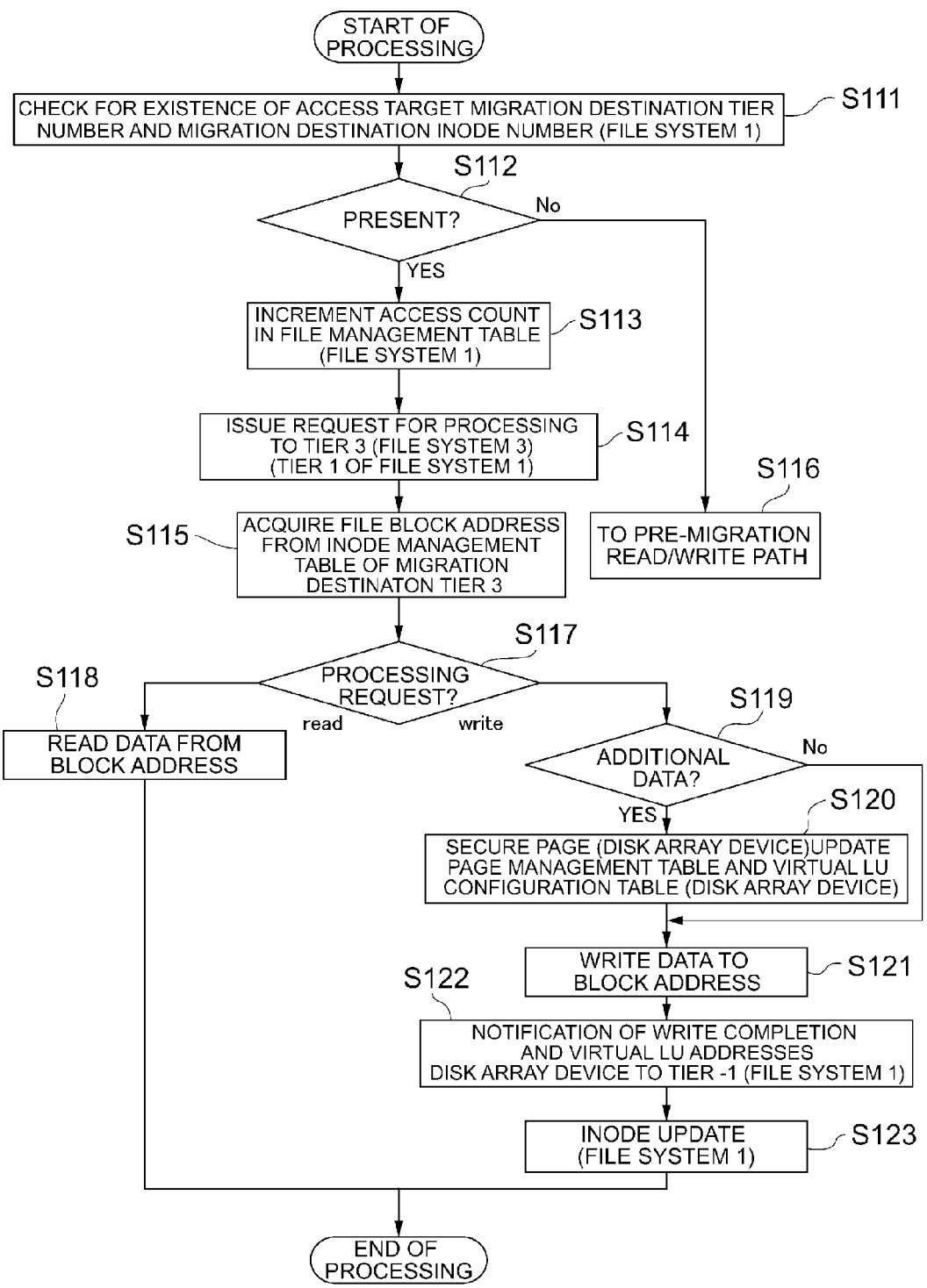
FIG. 70 is a flowchart showing the flow of read/write processing after tier migration according to this embodiment.

(6-1-2) Read/Write Processing of Existing Files (6-1-2-1) Read/Write Processing after Tier Migration As shown in FIG. 70, upon receiving a read/write request for an existing file from the client/host 300, the file system 1 of the file storage apparatus 100 refers to the inode management table 122A and checks for the existence of the migration destination tier number and migration destination inode number of an access target (S111). Furthermore, the file system 1 determines whether the access target migration destination tier number and migration destination inode number have been configured (S112).

If it is determined in step S112 that the migration destination tier number and migration destination inode number of the access target have been configured, the file system 1 increases (increments) the access count in the file management table 130 (S113).

Further, if Tier 3 has been configured as the migration destination tier number, for example, the file system 1 issues a processing request to the file system 3 managing Tier 3 (S114). The file system 3 then acquires a file block address which is a read/write processing target from the inode management table of the migration destination Tier 3 (S115).

If, on the other hand, it is determined in step S112 that the migration destination tier number and migration destination inode number of the access target have not been configured, the file system 3 executes pre-tier migration read/write processing which will be described subsequently (S116).

The file system 3 then determines whether the processing request is for read processing or write processing after the processing of step S115 (S117). If it is determined in step S117 that the processing request is for read processing, the file system 3 reads data from the storage area which corresponds to the block address acquired in step S115 (S118).

If, on the other hand, it is determined in step S117 that the processing request is for write processing, the file system 3 determines whether there is additional data to write (S119). If it is determined in step S119 that there is additional data to write, the page data mover program 212 of the disk array device 200 reserves a page and updates the page management table 270 and virtual LU configuration table 271 (S120).

The page data mover program 212 of the disk array device 200 then writes data to the block address reserved in step S120 (S121). The disk array device 200 then notifies the file system 1 of the read/write processing completion report and virtual LU addresses (S122). The file system 1 subsequently updates the inode management table 122A and reports completion of existing data write processing to the client/host 300 (S105).

(6-1-2-2) Read/Write Processing Before Tier Migration

Figure 71:
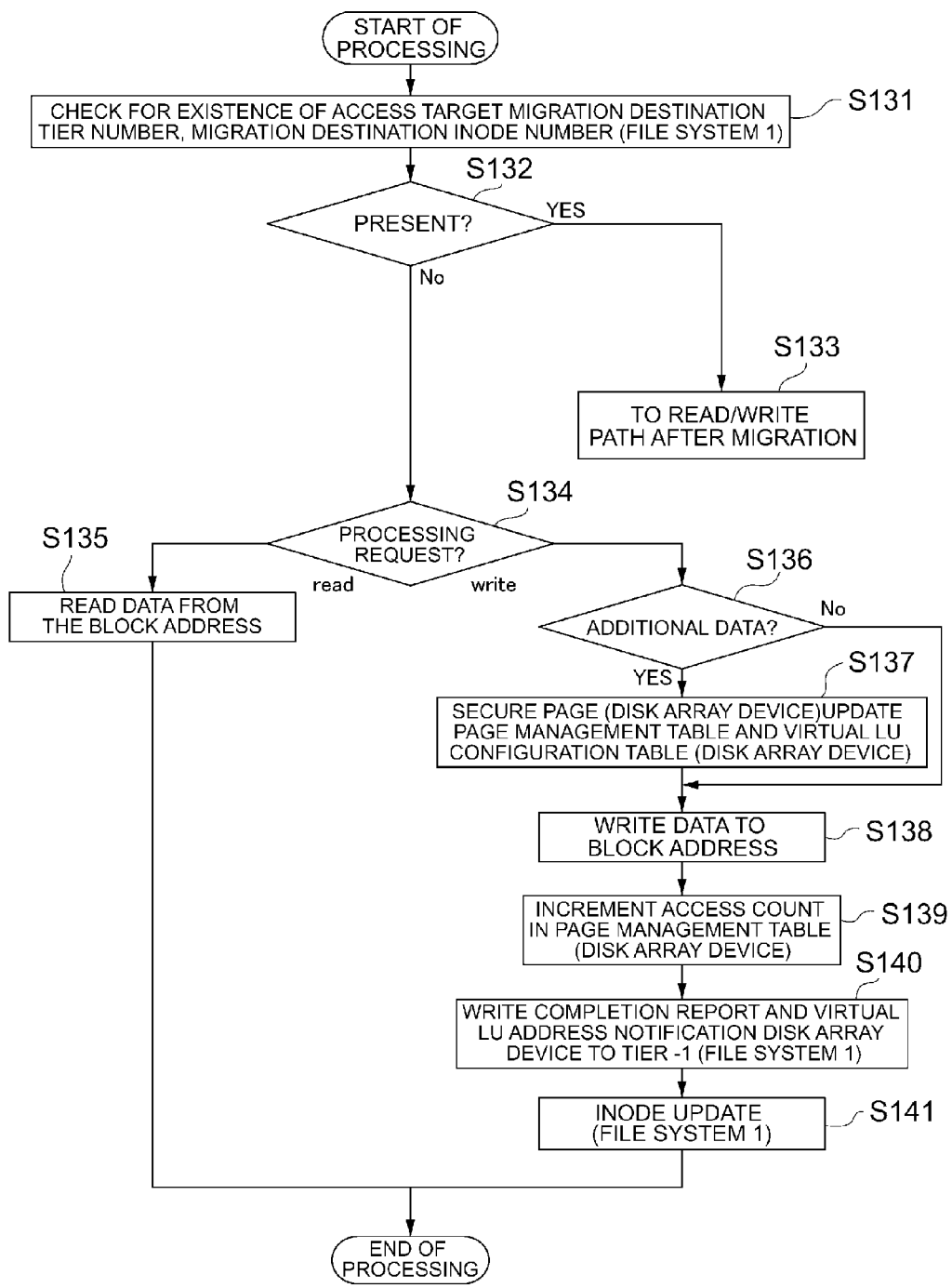
FIG. 71 is a flowchart showing the flow of read/write processing prior to tier migration according to this embodiment.

As shown in FIG. 71, upon receiving a read/write request for an existing file from the client/host 300, the file system 1 of the file storage apparatus 100 refers to the inode management table 122A and checks for the existence of the migration destination tier number and migration destination inode number of an access target (S131). Furthermore, the file system 1 determines whether the access target migration destination tier number and migration destination inode number have been configured (S132).

If it is determined in step S132 that the migration destination tier number and migration destination inode number of the access target have been configured, the file system 1 executes the processing of steps S134 and subsequent steps.

If it is determined in step S132 that the migration destination tier number and migration destination inode number of the access target have not been configured, the file system 1 executes read/write processing after tier migration (S133).

The file system 1 subsequently determines in step S134 whether the processing request is read processing or write processing (S134). If it is determined in step S134 that the processing request is for read processing, the file system 1 reads data from the storage area which corresponds to the read target block address (S135).

If, however, it is determined in step S134 that the processing request is for write processing, the file system 1 determines that there is additional data to write (S136). If it is determined in step S136 that there is additional data to write, the page data mover program 212 of the disk array device 200 reserves pages and updates the page management table 270 and virtual LU configuration control table 271 (S137).

The page data mover program 212 of the disk array device 200 writes data to the block address reserved in step S137 (S138). Furthermore, the disk array device 200 notifies the file system 1 of the read/write processing completion report and virtual LU addresses (S140). The file system 1 then updates the inode management table 122A and reports the fact that write processing of existing data is complete to the client/host 300 (S141).

Figure 72:
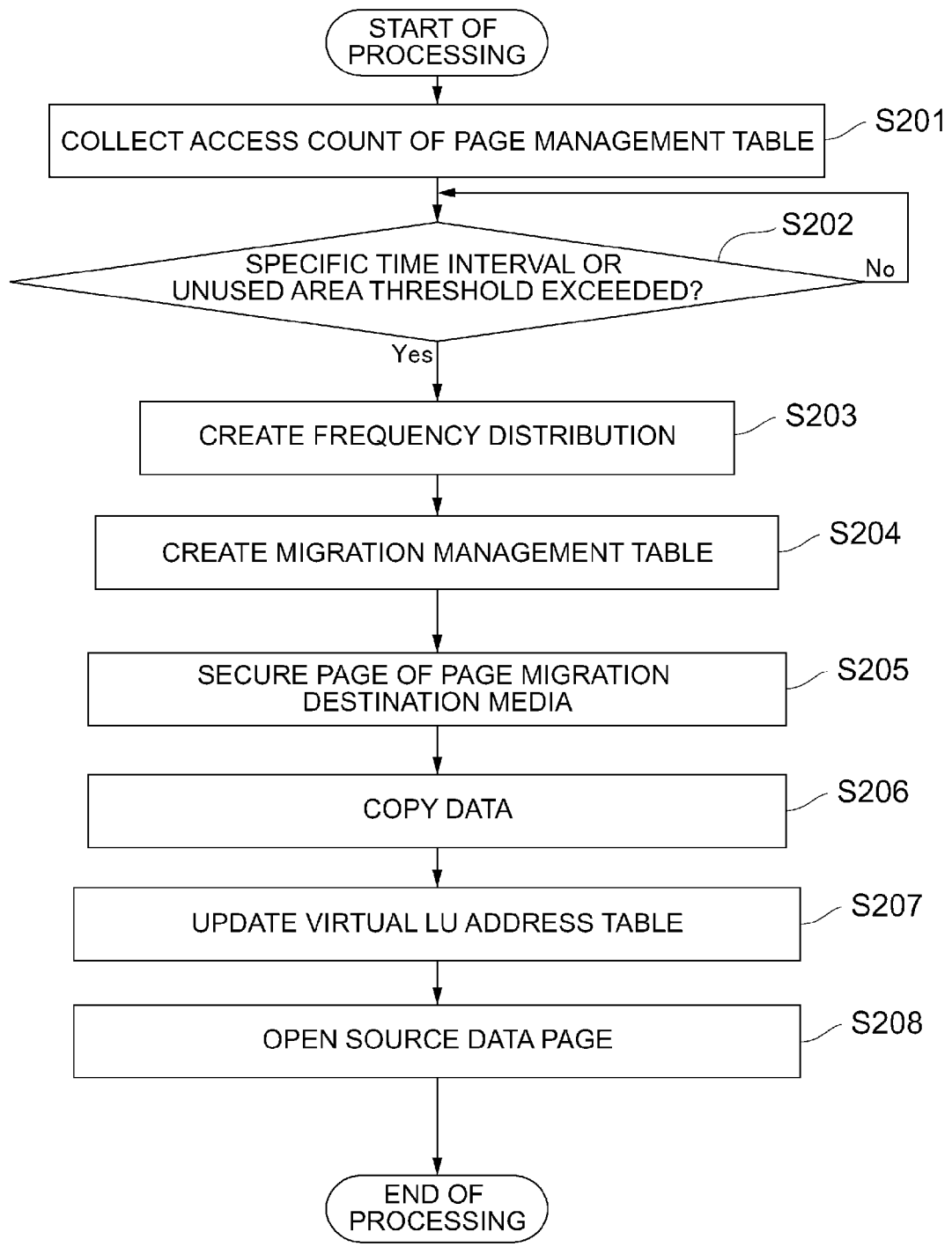
FIG. 72 is a flowchart showing the flow of block level tier control processing according to this embodiment.

(6-2) Hierarchical Control Processing (6-2-1) Block Level Hierarchical Control Processing As shown in FIG. 72, the page I/O monitoring program 211 of the disk array device 200 collects the access count of the page management table 270 (S201). The page I/O monitoring program 211 of the disk array device 200 then determines whether a specific time interval has elapsed or if the unused area exceeds a predetermined threshold (S202).

If it is determined in step S202 that the specific time interval has elapsed or if the unused area exceeds the predetermined threshold, the page I/O monitoring program 211 of the disk array device 200 creates an access frequency distribution on the basis of the access count (S203). If, on the other hand, it is determined in step S202 that the specific time interval has not elapsed or the unused area does not exceed the predetermined threshold, the page I/O monitoring program 211 of the disk array device 200 repeats the processing of step S202.

The page data mover program 212 of the disk array device 200 then creates a page migration management table 243 (S204). The page data mover program 212 of the disk array device 200 reserves the page of the migration destination storage medium (media) based on the page migration table 243 created in step S204 (S205). The page data mover program 212 of the disk array device 200 copies data stored in the migration source page to the page reserved in step S205 (S206).

The page data mover program 212 of the disk array device 200 updates the virtual LU address table 271 (S207). The page data mover program 212 of the disk array device 200 then releases the page where the migration source data is stored (S208).

(6-2-2) File Level Hierarchical Control Processing

Figure 73:
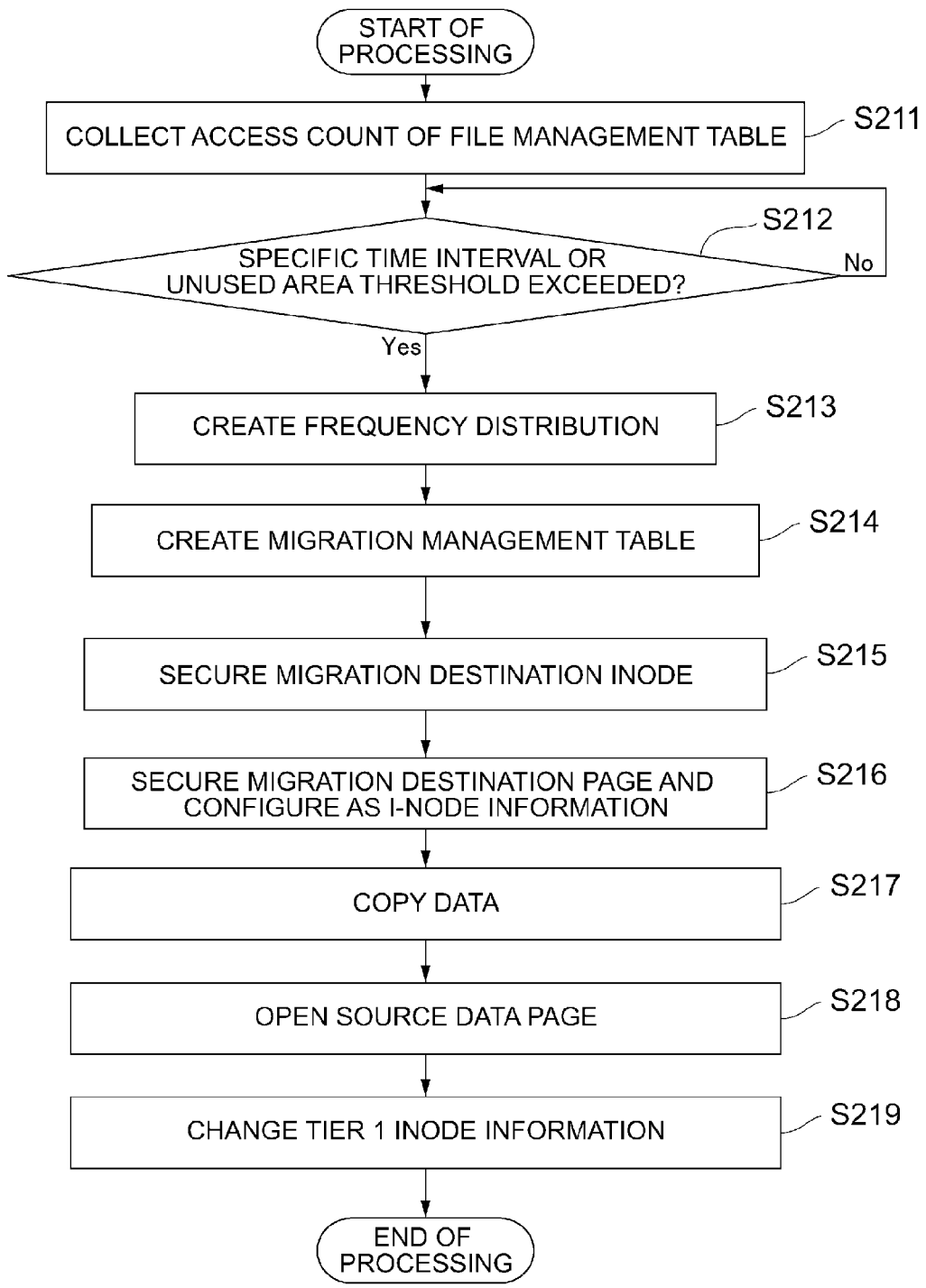
FIG. 73 is a flowchart showing the flow of file level tier control processing according to this embodiment.

As shown in FIG. 73, the file I/O monitoring program 112 of the file storage apparatus 100 collects the access counts of the file management table 130 (S211). The file I/O monitoring program 112 of the file storage apparatus 100 then determines whether a specific time interval has elapsed or whether an unused area exceeds a predetermined threshold (S212).

If it is determined in step S212 that the specific time interval has elapsed or the unused area exceeds the predetermined threshold, the file I/O monitoring program 112 of the file storage apparatus 100 creates an access frequency distribution based on the access count (S213). If it is determined in step S212 that a specific time interval has elapsed or the unused area does not exceed the predetermined threshold, the file I/O monitoring program 112 of the file storage apparatus 100 repeats the processing of step S212.

The file data mover program 113 of the file storage apparatus 100 creates the file migration management table 143 (S214). Further, the file data mover program 113 of the file storage apparatus 100 reserves the migration destination inode based on the file migration management table 143 created in step S214 (S215). The file data mover program 113 of the file storage apparatus 100 then reserves a page of the migration destination storage medium and configures the virtual LU address corresponding to this page as the inode information (S216). Further, the file data mover program 113 of the file storage apparatus 100 issues a request to the disk array device 200 and copies data stored in the migration source page to the page reserved in step S216 (S217).

The page data mover program 212 of the disk array device 200 releases the page in which the migration source data is stored (S218). The file storage apparatus 100 then changes the Tier 1 inode information (S219). More specifically, if a file has been migrated to a tier other than Tier 1 by the file level hierarchical control processing, the file data mover program 113 of the file storage apparatus 100 turns "ON" the stubbing flag of the Tier 1 inode management table 122A and configures the migration destination tier number and inode number.

Figure 74:
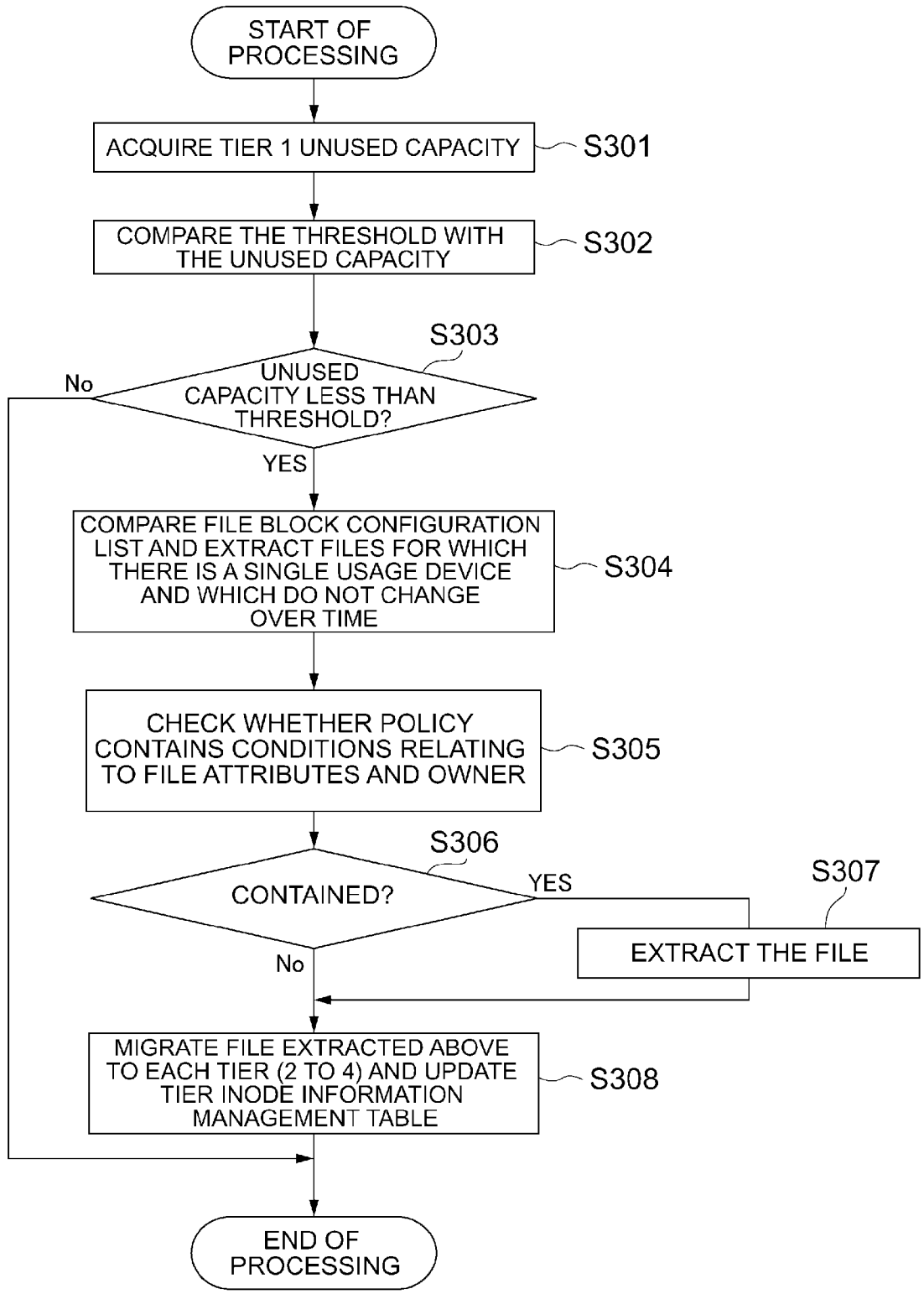
FIG. 74 is a flowchart showing the flow of processing to switch to file level tier control from block level tier control according to this embodiment.

(6-3) Hierarchical Control Switching Processing (6-3-1) Processing to Switch from Block Level Hierarchical Control to File Level Hierarchical Control As shown in FIG. 74, the file data mover program 113 of the file storage apparatus 100 first acquires the Tier 1 unused capacity (S301). The file data mover program 113 of the file storage apparatus 100 then compares the unused capacity acquired in step S301 with a pre-configured predetermined threshold (S302).

The file data mover program 113 of the file storage apparatus 100 then determines whether the acquired unused capacity is smaller than a threshold as a result of the comparison in step S302 (S303). If it is determined in step S303 that the unused capacity exceeds the threshold, the file data mover program 113 of the file storage apparatus 100 executes the processing of steps S304 and subsequent steps. If, on the other hand, it is determined in step S303 that the unused capacity is equal to or more than the threshold, the file data mover program 113 of the file storage apparatus 100 terminates the processing.

The file data mover program 113 of the file storage apparatus 100 compares the file block configuration list 150 indicating the file block usage and extracts files with a single usage device and for which there has been no change over time (S304). The file data mover program 113 of the file storage apparatus 100 then checks whether a predetermined policy that is pre-configured contains conditions relating to the file attribute or owner (S305).

The file data mover program 113 of the file storage apparatus 100 determines whether a predetermined policy that is pre-configured contains conditions relating to the file attribute or owner (S306). If it is determined in step S306 that predetermined conditions are included, the file data mover program 113 of the file storage apparatus 100 extracts the files corresponding to the predetermined conditions (S307). Meanwhile, if it is determined in step S304 that the predetermined conditions are not included, the file data mover program 113 of the file storage apparatus 100 migrates the files extracted in step S304 to the migration destination tiers (2 to 4) and updates the inode management table 122 of each tier (S308). Further, if a file corresponding to the predetermined conditions is extracted in step S307, the file data mover program 113 of the file storage apparatus 100 migrates the files to the tier meeting the predetermined conditions.

Figure 75:
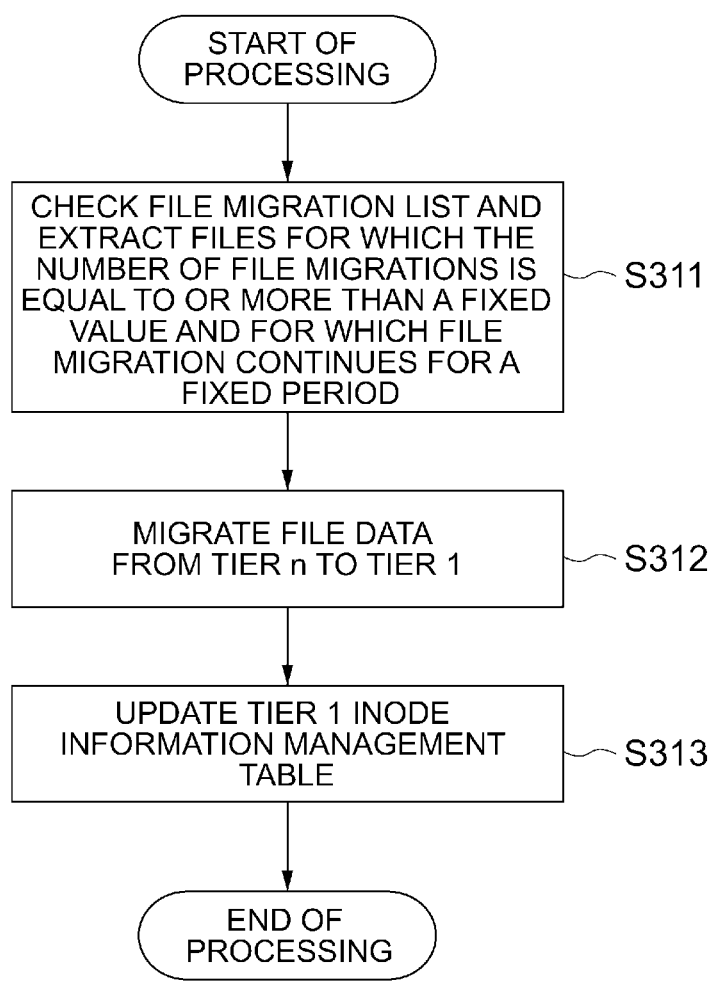
FIG. 75 is a flowchart showing the flow of processing to switch to block level tier control from file level tier control according to this embodiment.

(6-3-2) Processing to Switch from File Level Hierarchical Control to Block Level Hierarchical Control As shown in FIG. 75, the file data mover program 113 of the file storage apparatus 100 checks the file migration list 160 which indicates the number of migrations between files and extracts files for which the number of file migrations is equal to or more than a fixed value and for which file migration continues for a fixed period (S311).

The file data mover program 113 of the file storage apparatus 100 then migrates the files extracted in step S311 from the current tier (n) to Tier 1 (S312). The file data mover program 113 of the file storage apparatus 100 subsequently updates the Tier 1 inode management table 122A (S313).

(6-4) File Level Hierarchical Control Processing Between Tiers 2 to 4

(6-4-1) Hierarchical Control Processing from Upper Tier to Lower Tier

Figure 76:
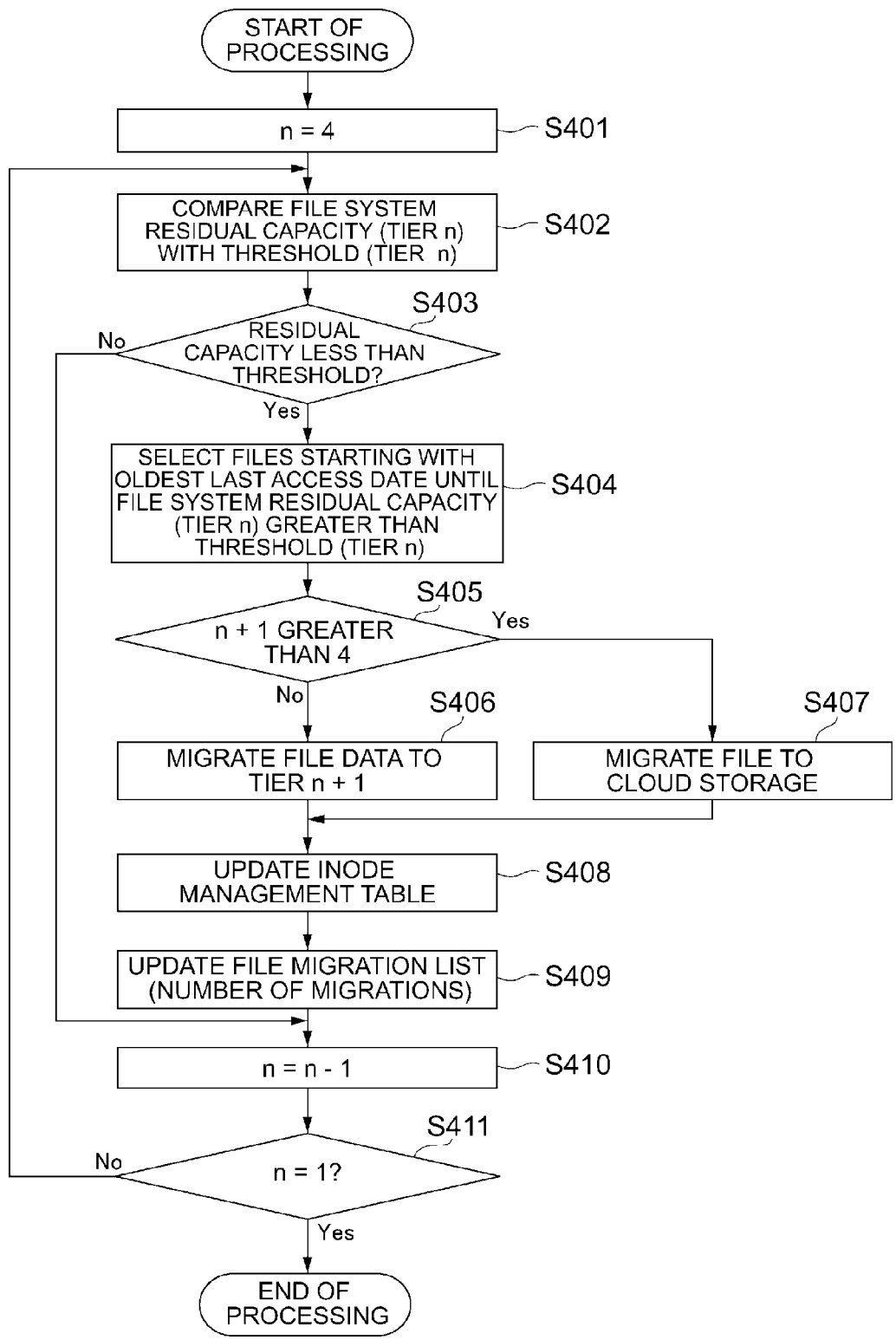
FIG. 76 is a flowchart showing the flow of tier control processing from an upper tier to a lower tier according to this embodiment.

As shown in FIG. 76, the file data mover program 113 of the file storage apparatus 100 substitutes 4 for n which indicates the tier level (S401). The file data mover program 113 of the file storage apparatus 100 compares the residual amount of the file system (Tier n) with the threshold (Tier n) (S402).

If it is determined in step S402 that the residual amount of the file system (Tier n) is smaller than a predetermined threshold (S403), the file data mover program 113 of the file storage apparatus 100 selects files starting with the file with the oldest last access date until the remaining capacity of the file system (Tier n) is greater than the threshold (Tier n) (S404). The file data mover program 113 of the file storage apparatus 100 selects files starting with the file with the oldest last access date in order to migrate files not used recently to a lower tier.

The file data mover program 113 of the file storage apparatus 100 determines whether n+1 is greater than four (S405). If it is determined in step S405 that n+1 is greater than 4, since a tier that is lower than Tier 4 does not exist, the file data mover program 113 of the file storage apparatus 100 migrates the file to cloud storage (S407). If, on the other hand, it is determined in step S405 that n+1 is greater than 4, the file data mover program 113 of the file storage apparatus 100 migrates the file data to the tier (Tier n+1) one stage lower than the current tier (S406).

If the remaining capacity of the upper tier reaches the predetermined threshold as a result of the file migration of step S406 or S407, the files of this tier are migrated to a tier that is one level below. For example, Tier 2 files are migrated to Tier 3, Tier 3 files are migrated to Tier 4, and Tier 4 files are migrated to cloud storage.

The file data mover program 113 of the file storage apparatus 100 subsequently updates the inode management table 122B (S408), and updates the number of migrations of the file migration list 160 (S409). The file data mover program 113 of the file storage apparatus 100 substitutes n−1 for n (S410).

Furthermore, the file data mover program 113 of the file storage apparatus 100 determines whether n is 1 (S411). The file data mover program 113 of the file storage apparatus 100 ends the processing if n is 1 and if n is not 1, repeats the processing of step S402 and subsequent steps.

(6-4-2) Hierarchical Control Processing from Lower Tier to Upper Tier

Figure 77:
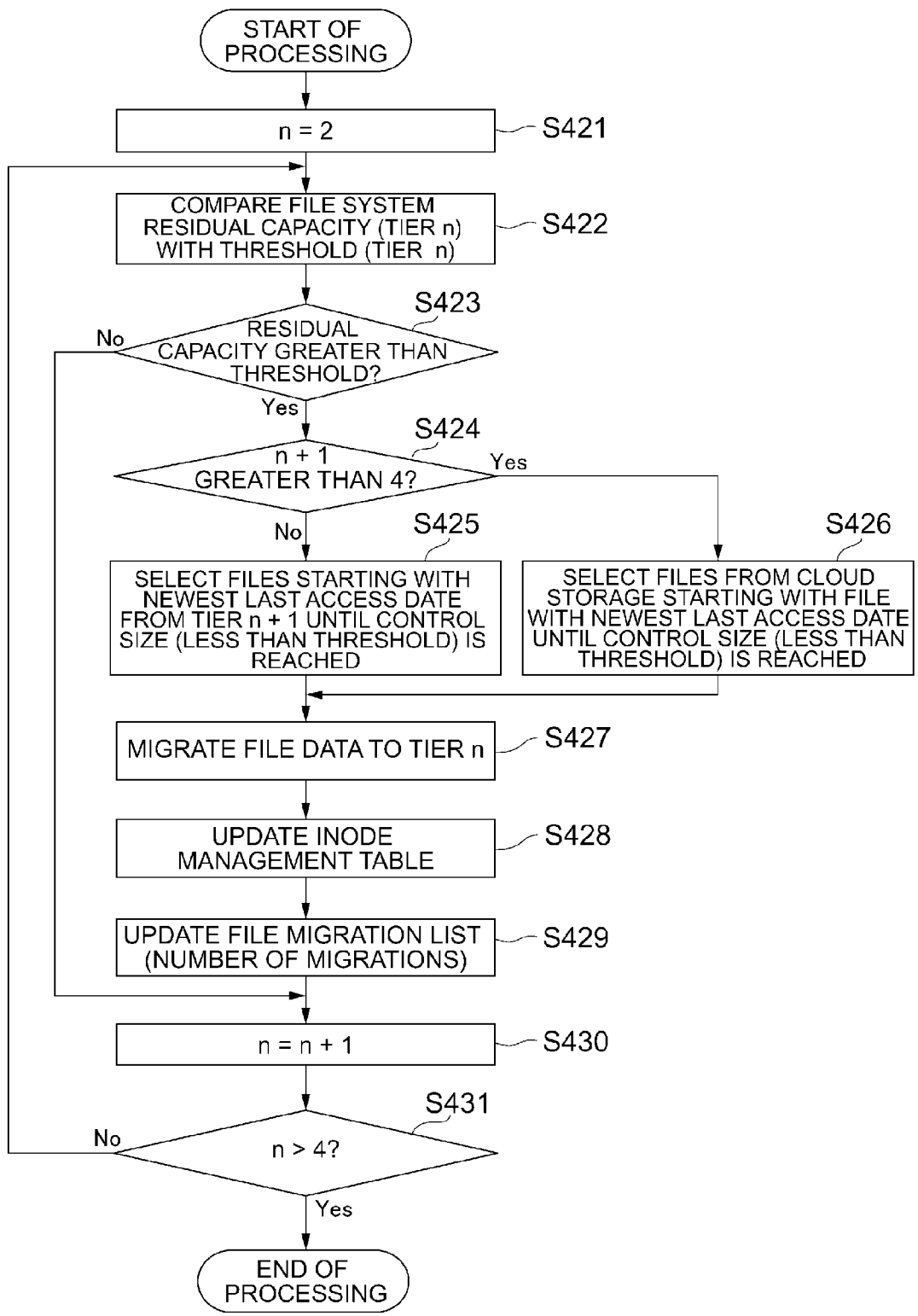
FIG. 77 is a flowchart showing the flow of tier control processing from a lower tier to an upper tier according to this embodiment.

As shown in FIG. 77, the file data mover program 113 of the file storage apparatus 100 substitutes 2 for n which indicates the tier level (S421). Furthermore, the file data mover program 113 of the file storage apparatus 100 compares the remaining capacity of the file system (Tier n) with the threshold (Tier n) (S422).

If it is determined in step S422 that the remaining capacity of the file system (Tier n) is greater than a predetermined threshold (S423), the file data mover program 113 of the file storage apparatus 100 determines that n+1 is greater than 4 (S424). If, on the other hand, it is determined in step S422 that the remaining capacity of the file system (Tier n) is equal to or less than a predetermined threshold (S423), the file data mover program 113 of the file storage apparatus 100 executes the processing of step S430 and subsequent steps. If the remaining capacity of the file system is greater than the predetermined threshold in step S424, this indicates that the data of file systems in tiers above the current file system can be migrated.

If it is determined in step S424 that n+1 is equal to or less than 4, the file data mover program 113 of the file storage apparatus 100 selects files starting with the file with the newest last access date from Tier n+1 until the capacity of the file system (Tier n) reaches a control size which is smaller than a predetermined threshold (S425).

If, on the other hand, it is determined in step S424 that n+1 is greater than 4, the file data mover program 113 of the file storage apparatus 100 selects files starting with the file with the newest last access date from cloud storage until the capacity of the file system (Tier n) reaches a control size which is smaller than the predetermined threshold (S426).

The file data mover program 113 of the file storage apparatus 100 migrates the data of the files selected in step S425 or S426 to Tier n (S427).

The file data mover program 113 of the file storage apparatus 100 subsequently updates the inode management table 122B (S428) and updates the number of migrations of the file migration list 160 (S429). The file data mover program 113 of the file storage apparatus 100 substitutes n+1 for n (S410).

Furthermore, the file data mover program 113 of the file storage apparatus 100 determines whether N is greater than 4 (S431). The file data mover program 113 of the file storage apparatus 100 ends the processing if n is greater than 4 and repeats the processing of step S422 and subsequent steps if n is equal to or less than 4.

(7) Effects of Embodiment

As mentioned earlier, in the storage system 1 according to this embodiment, the hierarchical control processing is divided into two stages and file level hierarchical control or block level hierarchical control can be executed according to the file characteristics. For example, in order to pre-configure a policy for determining the file characteristics, a determination is made regarding whether to execute file level hierarchical control or execute block level hierarchical control according to the policy. Further, in the file level hierarchical control and block level hierarchical control, the I/O characteristic is detected, and switching from file level hierarchical control to block level hierarchical control or switching from block level hierarchical control to file level hierarchical control is performed.

As a result, data can be efficiently managed by switching between file level hierarchical control and block level hierarchical control according to file characteristics.

INDUSTRIAL APPLICABILITY

The present invention can be applied to a storage apparatus which switches between block level hierarchical control and file level hierarchical control.

REFERENCE SIGNS LIST

100 File storage apparatus
111 File sharing program

112 Monitoring program
113 File data mover program
114 File system
115 Kernel/driver
200 Disk array device
210 Microprogram
211 Monitoring program
212 Page data mover program

The invention claimed is:

1. A storage apparatus which is connected via a network to a host computer which requests data writing, comprising:
   storage media of a plurality of types of varying performance;
   a volume management unit configured to manage storage areas provided by the storage media of the plurality of types as different storage tiers and manage storage tiers of a same type or different types as a pool, and provide predetermined areas of the pool to the host computer as volumes; and
   a file management unit configured to construct file systems, for managing data in file units configured from a plurality of blocks, in the volumes, and receive file unit data write requests from the host computer and store the data into the volumes,
   wherein, among a plurality of the file systems, the file management unit is configured to migrate data in block units in one of the file systems in the volumes or migrate data in file units in the other of the file systems, based on a preconfigured user policy stored in the file management unit, and
   wherein the preconfigured user policy includes a condition for selecting the file unit migration or the block unit migration.

2. The storage apparatus according to claim 1,
   wherein the file management unit stores the data in the volume configured from storage tiers of different types when a file unit data write request is received from the host computer.

3. The storage apparatus according to claim 1,
   wherein the file management unit is configured to migrate data in block units in the file system in the volume configured from storage tiers of different types.

4. The storage apparatus according to claim 3,
   wherein the file management unit is configured to migrate data in block units between storage tiers of different types in one of the volumes according to the frequency of access by the host computer to the block unit data.

5. The storage apparatus according to claim 3,
   wherein the file management unit is configured to migrate the file in the volume configured from the storage tiers in cases where there is a single storage tier where files configured from a plurality of blocks are stored as a result of the migration of block unit data between the storage tiers.

6. The storage apparatus according to claim 5,
   wherein, when a file is migrated to another file system in the volume configured from storage tiers of the same type from a single file system in the volume configured from storage tiers of different types, the file management unit is configured to determine whether the file can be migrated to any of the file systems on the basis of predetermined conditions.

7. The storage apparatus according to claim 5,
   wherein, when a file is migrated to another file system in the volume configured from storage tiers of the same type from a single file system in the volume configured from storage tiers of different types, the file management unit is configured to configure, in a file configuration management table which manages the configuration of the single file system, a stubbing flag which indicates that the file has been migrated to the other file system and stubbed, and information identifying the other file system of the migration destination.

8. The storage apparatus according to claim 7,
   wherein, when the file system in the volume configured from storage tiers of the same type exists in a plurality in each of the different storage tiers,
   the file management unit is configured to migrate files to a file system in the volume configured from another storage tier with a lower performance than the single storage tier from the file system in the volume configured from a single storage tier according to the unused capacity of the file system.

9. The storage apparatus according to claim 7,
   wherein, when the file system in the volume configured from storage tiers of the same type exists in a plurality for each of the different storage tiers,
   the file management unit is configured to migrate files to the file system in the volume configured from another storage tier with a higher performance than the single storage tier from the file system in the volume configured from the single storage tier according to the unused capacity of the file system.

10. The storage apparatus according to claim 7,
    wherein, when the file system in the volume configured from storage tiers of the same type exists in a plurality in each of the different storage tiers,
    after migrating the file to the other file system in the volume configured from storage tiers of the same type from a single file system in the volume configured from storage tiers of different types, the file management unit is configured to migrate the file to the single file system in the volume configured from storage tiers of different types if file migration to the other file system occurs a predetermined number of times or more.

11. A data management method which uses a storage apparatus which is connected via a network to a host computer which requests data writing, the storage apparatus comprising storage media of a plurality of types of varying performance and a file management unit,
    the data management method comprising:
    a first step of managing storage areas provided by each of the storage media of a plurality of types as different storage tiers and managing storage tiers of a same type or different types as a pool;
    a second step of providing predetermined areas of the pool to the host computer as volumes;
    a third step of constructing file systems, which manage data in file units which are configured from a plurality of blocks in the volumes;
    a fourth step of receiving a file unit data write request from the host computer and storing the data into the volumes; and
    a fifth step of migrating, among the plurality of file systems, data in block units in one of the file systems in the volumes or migrating data in file units in the other of the file systems, based on a preconfigured user policy stored in the file management unit,
    wherein the preconfigured user policy includes a condition for selecting the file unit migration or the block unit migration.

* * * * *